US012800285B2

(12) United States Patent
Yamaji et al.

(10) Patent No.: US 12,800,285 B2
(45) Date of Patent: Nov. 17, 2026

(54) AUTOMATIC MEASURING APPARATUS

(71) Applicant: MITUTOYO CORPORATION, Kanagawa (JP)

(72) Inventors: Masashi Yamaji, Hiroshima (JP); Chihiro Yamamoto, Kanagawa (JP); Keita Ogawa, Kanagawa (JP); Shuji Hayashida, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 288 days.

(21) Appl. No.: 18/820,519

(22) Filed: Aug. 30, 2024

(65) Prior Publication Data

US 2025/0076021 A1 Mar. 6, 2025

(30) Foreign Application Priority Data

Aug. 31, 2023 (JP) ................................ 2023-141875

(51) Int. Cl.
*G01B 7/02* (2006.01)
*G01B 7/00* (2006.01)
(Continued)

(52) U.S. Cl.
CPC ............... *G01B 7/02* (2013.01); *G01B 7/002* (2013.01); *G01B 3/18* (2013.01); *G01B 3/38* (2013.01)

(58) Field of Classification Search
CPC .................................... G01B 7/02; G01B 7/12
(Continued)

(56) References Cited

U.S. PATENT DOCUMENTS 4,649,648 A * 3/1987 Nagaoka .................. G01B 5/02 33/700
5,134,782 A * 8/1992 Breyer ................... G01B 5/008 33/503
(Continued)

FOREIGN PATENT DOCUMENTS

| | | |
|---|---|---|
| JP | 8-14871 | 1/1996 |
| JP | 10-89903 | 4/1998 |
| JP | 2019-100904 | 6/2019 |

OTHER PUBLICATIONS

U.S. Appl. No. 18/820,539 to Yamaji et al., filed on Aug. 30, 2024.

*Primary Examiner* — George B Bennett
(74) *Attorney, Agent, or Firm* — Greenblum & Bernstein, P.L.C.

(57) ABSTRACT

There is provided an automatic measuring apparatus that automates an inexpensive and easy-to-use contact-type measuring device. An automatic measuring apparatus includes a measuring device including a movable element that is displaceable with respect to a fixed element and moves forward and backward to be brought into contact with or away from a workpiece, and a displacement detection part that detects a displacement or position of the movable element, and an automatic operation part that automates the forward/backward movement of the movable element by power. When the movable element is brought into contact with the workpiece, vibration is applied directly or indirectly to at least one of the workpiece and the measuring device in such a manner that contacting surfaces of the workpiece and the measuring device are in close contact with each other by changing a relative position and posture between the workpiece and the measuring device.

5 Claims, 30 Drawing Sheets

(51) Int. Cl.
*G01B 3/18* (2006.01)
*G01B 3/38* (2006.01)

(58) Field of Classification Search
USPC .......................................... 33/1 BB, 832, 833
See application file for complete search history.

(56) References Cited

U.S. PATENT DOCUMENTS

| | | | | |
|---|---|---|---|---|
| 8,104,189 | B2 * | 1/2012 | Tait | G01B 5/008<br>33/503 |
| 9,091,522 | B2 * | 7/2015 | Nakagawa | G01B 21/045 |
| 9,678,701 | B2 * | 6/2017 | Cook | G01B 3/205 |
| 10,232,511 | B2 * | 3/2019 | Hofmann | G01B 21/042 |
| 11,466,971 | B2 * | 10/2022 | Yamaji | G01B 5/02 |
| 11,524,410 | B2 * | 12/2022 | O'Hare | B25J 9/1692 |
| 12,680,802 | B2 * | 7/2026 | Ogawa | G01B 3/008 |
| 2019/0168378 | A1 | 6/2019 | Ishikawa et al. | |
| 2024/0151506 | A1 * | 5/2024 | Takatsu | B25J 9/1679 |
| 2025/0076019 | A1 * | 3/2025 | Yamaji | G01B 5/06 |

* cited by examiner

HOLE RETRACTION STEP

AUTOMATIC MEASURING APPARATUS

INCORPORATION BY REFERENCE

This application is based upon and claims the benefit of priority from JP patent application No. 2023-141875, filed on Aug. 31, 2023 (DAS code 0D23), the disclosure of which is incorporated herein in its entirety by reference.

BACKGROUND OF THE INVENTION

1. Field of the Invention

The present invention relates to an automatic measuring apparatus that automatically measures a workpiece using a small-sized measuring device for measuring a dimension of the workpiece.

2. Description of Related Art

Micrometers, calipers, Hall tests, cylinder gauges, and Borematic (registered trademark) are known as measuring devices (measuring tools) that measure the dimensions of workpieces. Such contact-type measuring devices (measuring tools) are widely used because of their ease of use, measurement stability, relatively low cost, and other advantages. However, it is required for a workpiece and a movable element (a spindle, a measuring jaw, or a contact point) to be in proper close contact and for the same measurement pressure to be constantly applied, which inevitably results in manual measurement. Therefore, measurement with such a contact-type measuring machine is time-consuming and labor intensive.

As an alternative to manual measurement, non-contact measurement devices such as air micrometers and laser scan micrometers have been proposed for use at production sites (JP H08-14871 A). However, air micrometers and laser scan micrometers are themselves extremely expensive and relatively difficult to maintain.

Patent Literature 1: JP H10-89903 A

Patent Literature 2: JP 2019-100904 A

Patent Literature 3: JP H08-14871 A

SUMMARY OF THE INVENTION

Although various proposals have been made to automate contact measurement, such as those using motor power, there have been no cases of successful practical applications that have been widely used by the general public (JP H10-089903 A). In addition, it is possible to automate contact measurement by using a coordinate measuring machine (CMM) or the like (JP 2019-100904 A), but it requires an investment of tens to hundreds of millions of yen, which is not appropriate to use a CMM as a substitute for measurement using a micrometer or caliper.

A purpose of the present invention is to provide an automatic measuring apparatus that automates an inexpensive and easy-to-use contact-type measuring device.

An automatic measuring apparatus according to an exemplary embodiment of the present invention includes:

a measuring device that measures a dimension of a workpiece, the measuring device including a movable element that is displaceable with respect to a fixed element and moves forward and backward to be brought into contact with or away from the workpiece, and a displacement detection part that detects a displacement or position of the movable element;

an automatic operation part that automates the forward/backward movement of the movable element by power; and a vibration actuator that directly or indirectly applies vibration, when the movable element is brought into contact with the workpiece, to at least one of the workpiece and the measuring device to facilitate a change in a relative position and posture between the workpiece and the measuring device in such a manner that contacting surfaces of the workpiece and the movable element are in close contact with each other by changing the relative position and posture between the workpiece and the measuring device at a pressure lower than a predetermined measurement pressure set in advance in the measuring device, in which the automatic measuring apparatus automatically measures the workpiece using the measuring device.

In an exemplary embodiment of the present invention, it is preferable that the automatic measuring apparatus further includes:

a moving means for relatively moving the workpiece and the measuring device to place the workpiece within a measurement range of the measuring device; and a floating joint part interposed between the moving means and the measuring device to allow relative translation and rotation of the measuring device with respect to the moving means, in which the vibration actuator is attached to the measuring device.

In an exemplary embodiment of the present invention, it is preferable that the automatic measuring apparatus further includes:

a workpiece holding part that holds the workpiece, in which the workpiece holding part holds the workpiece in such a manner that a position and posture of the workpiece is changed at a pressure lower than the predetermined measurement pressure set in advance in the measuring device when the movable element is brought into contact with the workpiece, and the vibration actuator is attached to the workpiece holding part.

In an exemplary embodiment of the present invention, it is preferable that the automatic operation part moves the movable element forward to bring the movable element into contact with the workpiece, then moves the movable element backward by a predetermined amount, and finally moves the movable element forward again to generate the predetermined measurement pressure between the workpiece and the movable element, and the vibration actuator is driven, when the movable element is moved forward again to generate the predetermined measurement pressure between the workpiece and the movable element.

In an exemplary embodiment of the present invention, it is preferable that the displacement detection part acquires the displacement or position of the movable element as a measurement value after the automatic operation part stops the forward re-movement of the movable element and the vibration actuator stops driving.

An automatic measuring apparatus according to an exemplary embodiment of the present invention includes;

a measuring device that measures a dimension of a workpiece, the measuring device including a movable element that is displaceable with respect to a fixed element and moves forward and backward to be brought into contact with or away from the workpiece, and a displacement detection part that detects a displacement or position of the movable element;

an automatic operation part that automates the forward/backward movement of the movable element by power; and a workpiece holding part that holds the workpiece in such a manner that a position and posture of the workpiece is changed at a pressure lower than a predetermined measurement pressure set in advance in the measuring device when the movable element is brought into contact with the workpiece.

In an exemplary embodiment of the present invention, it is preferable that the workpiece holding part includes:

a base part;

a workpiece installation stage on which the workpiece is to be placed or installed; and a floating joint part interposed between the base part and the workpiece installation stage to allow relative displacement of the workpiece installation stage with respect to the base part.

In an exemplary embodiment of the present invention, it is preferable that the floating joint part includes:

a translation-allowing mechanism part that allows translational displacement of the workpiece installation stage with respect to the base part; and a rotation-allowing mechanism part that allows rotation of the workpiece installation stage with respect to the base part, and the base part, the translation-allowing mechanism part, the rotation-allowing mechanism part, and the workpiece installation stage are provided in this order from a lower side.

In an exemplary embodiment of the present invention, it is preferable that the translation-allowing mechanism part includes a translation body that allows translation of the workpiece installation stage with respect to the base part, and the rotation-allowing mechanism part includes a flexible body that is deformable to allow displacement of the workpiece installation stage in an inclination direction with respect to the base part.

In an exemplary embodiment of the present invention, it is preferable that the workpiece holding part includes a restriction means for regulate displacement of the workpiece installation stage, and the restriction means regulates the displacement of the workpiece installation stage when the movable element is away from the workpiece, and allows the displacement of the workpiece installation stage when the movable element and the workpiece are in contact with each other and the measurement pressure is applied to the workpiece from the movable element.

In an exemplary embodiment of the present invention, it is preferable that the workpiece holding part includes a vibration actuator that directly or indirectly applies vibration to the workpiece to facilitate a change in a relative position and posture between the workpiece and the measuring device.

In an exemplary embodiment of the present invention, it is preferable that the workpiece holding part includes:

a restriction means for regulating displacement of the workpiece installation stage; and a vibration actuator that directly or indirectly applies vibration to the workpiece to facilitate a change in the relative position and posture between the workpiece and the measuring device, the automatic operation part moves the movable element forward to bring the movable element into contact with the workpiece, then moves the movable element backward by a predetermined amount, and finally moves the movable element forward again to generate the predetermined measurement pressure between the workpiece and the movable element, and the restriction means releases the workpiece installation stage to allow the displacement of the workpiece installation stage and the vibration actuator is driven, when the movable element is moved forward again to generate the predetermined measurement pressure between the workpiece and the movable element.

DETAILED DESCRIPTION

Figure 1:
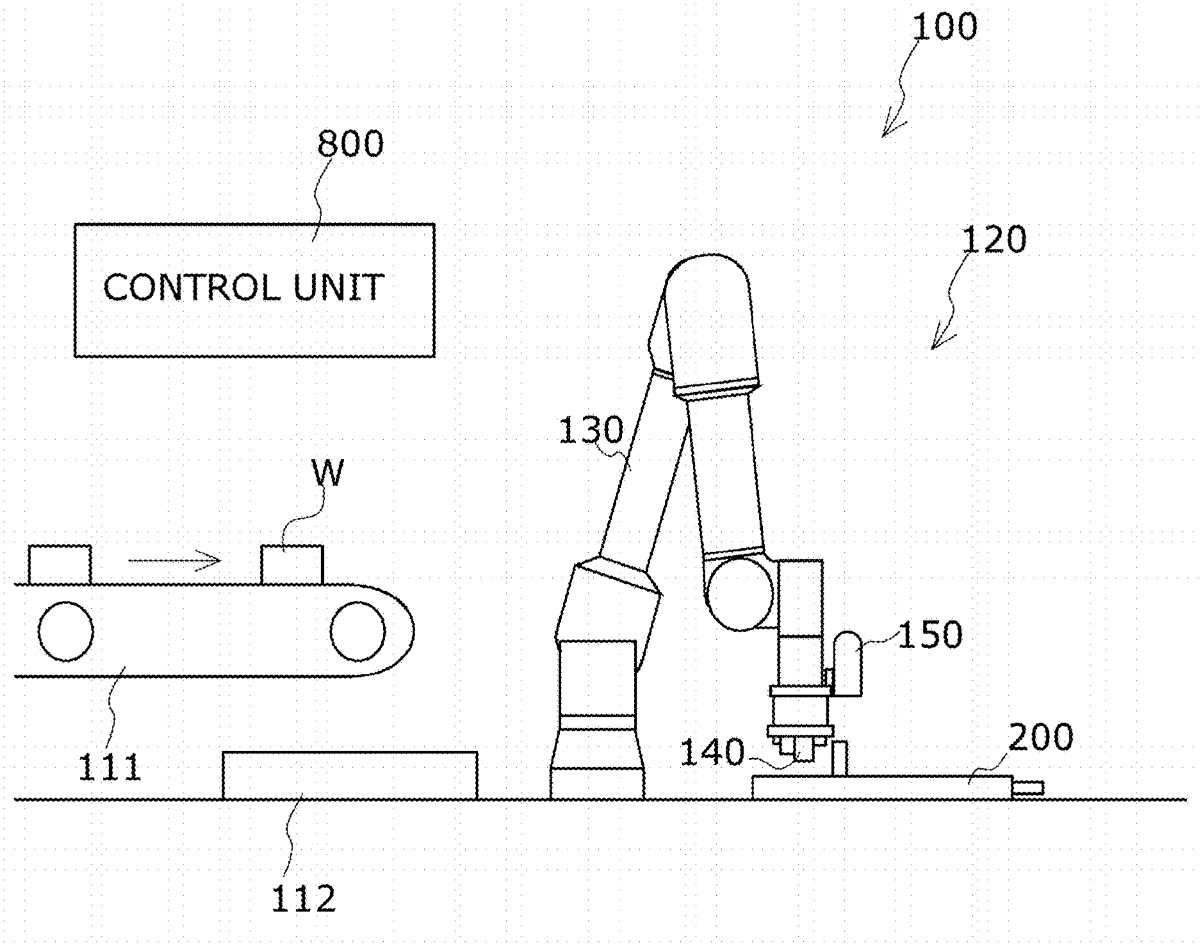
FIG. 1 is an overall configuration diagram showing an automatic measuring apparatus according to a first exemplary embodiment.

Embodiments of the present invention are illustrated and described with reference to the reference signs assigned to the elements in the drawings.

Note that, each embodiment may be implemented independently, or two or more embodiments may be implemented in combination, and examples of modification added in each embodiment are applicable to other embodiments.

First Exemplary Embodiment

In the following, a first exemplary embodiment of the present invention is described.

FIG. 1 is an overall configuration diagram showing an automatic measuring apparatus 100.

The automatic measuring apparatus 100 includes a measuring-apparatus main body 120 and a control unit 800.

(Measuring-Apparatus Main Body 120)

The measuring-apparatus main body 120 includes a robot arm part 130 as a moving means, and an automatic measuring unit 200.

The moving means will be described using an articulated arm robot as an example, but a simpler moving mechanism combining one or two axes of rotation or straight lines may be used. Since the moving means is only required to relatively move a workpiece W and a measuring device, the moving means can transfer the workpiece W or the moving means can move the measuring device, but the moving means that transfers the workpiece W will be described as an example in the first exemplary embodiment. For example, a workpiece W (for example, a part) machined by a machine tool (for example, a numeric control (NC) lathe) is conveyed by a conveyor belt 111.

The workpiece W is transferred to a stocker 112 for pretreatment. As pretreatment, deoiling and dust removal by air blow may be performed. The pretreated workpiece W is transferred by a robot arm part 130, which is the moving means, into a measurement area of the automatic measuring unit 200.

The robot arm part 130 is an articulated robot arm part 130 and includes a robot hand 140 for grasping the workpiece W at its tip and a camera 150 for image recognition. The robot arm part 130 recognizes the workpiece W by image recognition, grasps the workpiece W with the robot hand 140, and transfers the workpiece W to the measurement area of the automatic measuring unit 200. Here, the robot hand 140 is assumed to place the workpiece W in a preset orientation (posture) in the measurement area and release the workpiece W once.

For a simpler system, a person may manually pick up and transfer the workpiece W.

The workpiece W transferred to the measurement area in this manner is measured for its dimension by the automatic measuring unit 200.

(Automatic Measuring Unit 200)

The automatic measuring unit 200 brings a contact point (movable element) into contact with a workpiece W to measure a dimension of the workpiece W. Although it is possible to measure either the inside dimension (inside diameter) or the outside dimension (outside diameter) as the dimension of the workpiece W, the outside dimension (outside diameter) is measured as an example in the first exemplary embodiment.

The automatic measuring unit 200 is an automated micrometer 300 as a small-sized measuring device (small-sized measuring tool). The automatic measuring unit 200 in the first exemplary embodiment is referred to as an automatic micrometer device 200.

Figure 2:
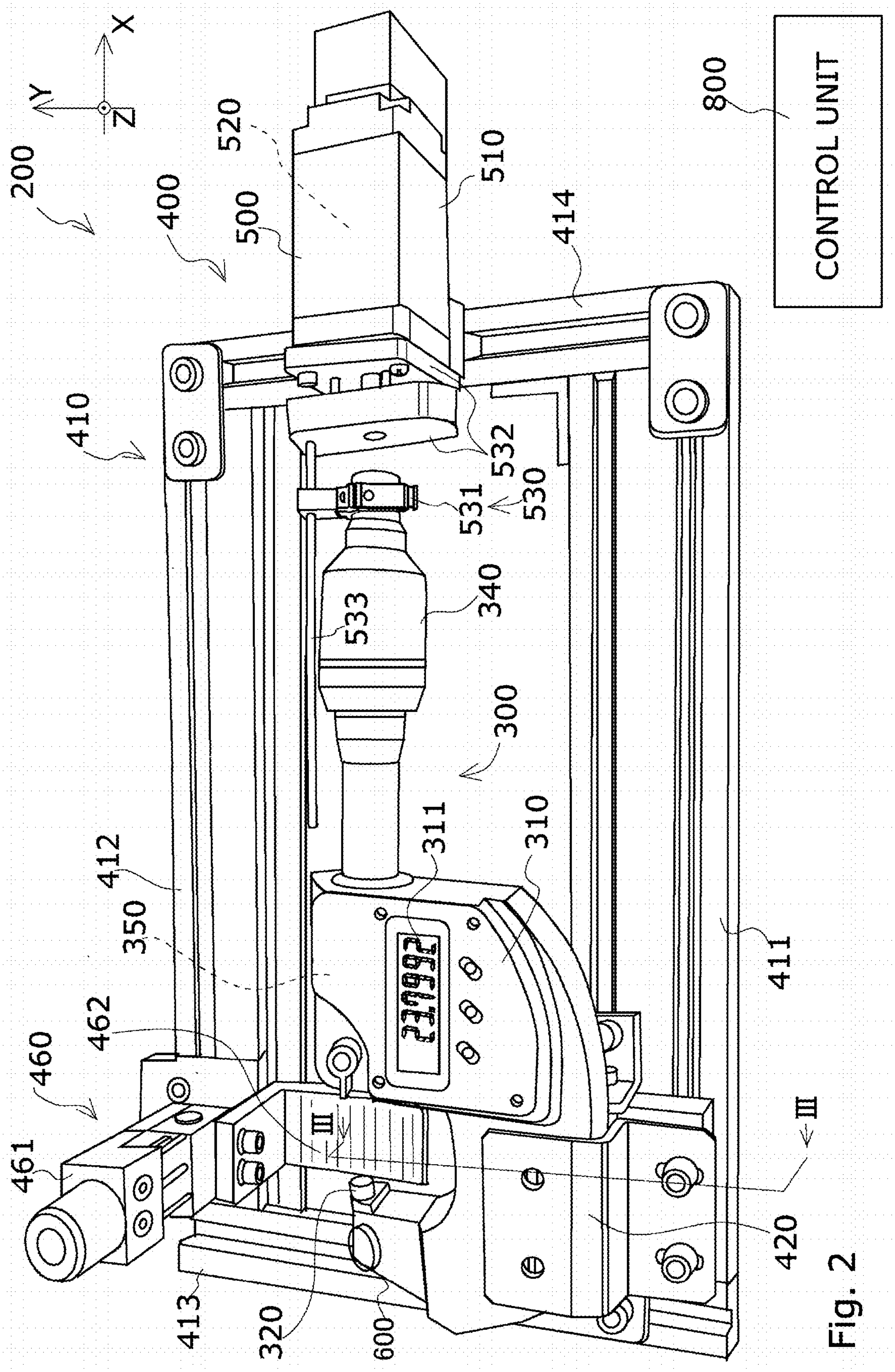
FIG. 2 is an external view of an automatic micrometer device.

FIG. 2 is an external view of the automatic micrometer device 200.

The automatic micrometer device 200 includes a micrometer (measuring device) 300, a measuring-device support frame part 400, an automatic operation part 500, a workpiece holding base part (workpiece holding part) 460, and a vibration motor (vibration actuator) 600.

The micrometer 300 is originally a small-sized, manually operated measuring device, and a commercially available micrometer 300 can be used as the micrometer 300 in the present exemplary embodiment.

The configuration of the micrometer 300 is briefly described below.

The micrometer 300 includes a U-shaped frame (fixed element) 310, a spindle (movable element) 330, a thimble part 340, and a displacement detection part 350.

The U-shaped frame 310 includes an anvil 320 inside one end of the U-shape.

The spindle 330 is provided at the other end of the U-shaped frame 310 and is axially movable forward and backward with respect to the anvil 320. The spindle 330 is provided with a measuring surface on one end face of the spindle 330 to be brought into contact with the workpiece W. Similarly, the anvil 320 is provided with a measuring surface on the other end face of the anvil 320 to be brought into contact with the workpiece W. The measuring surfaces are machined into flat surfaces and formed of cemented carbide material or ceramic.

Note that the U-shaped frame 310 may be, for example, a micrometer head that does not include the anvil 320. The anvil 320, which is paired with the spindle 330 to sandwich the workpiece W, may be installed on the measurement axis as a separate body from the micrometer 300.

The spindle 330 is fed and moved forward and backward in an axial direction by the rotary operation of the thimble part 340. There are two types of methods for feeding the spindle 330: a rotary feed type in which the spindle 330 itself rotates, and a linear feed type in which the spindle 330 itself does not rotate. In the rotary feed type, the spindle 330 is provided with a male thread, and the U-shaped frame 310 is provided with a female thread. The thimble part 340 and the spindle 330 are engaged to rotate together, and the spindle 330 is rotated by the rotary operation of the thimble part 340. Then, the spindle 330 is moved forward or backward by the screw feed. In the linear feed type, a feed screw is provided inside the thimble part 340, and the spindle 330 is provided with a pin that engages with the feed screw. When the thimble part 340 is rotated while the spindle 330 is locked, the spindle 330 is fed by the engagement between the pin and the feed screw. The type of the micrometer 300 to be employed in the present exemplary embodiment can be either the rotary feed type or the linear feed type.

The thimble part 340 is disposed at the other end of the spindle 330 at the other end of the U-shaped frame 310. The thimble part 340 is an operation part that moves the spindle 330 forward and backward by rotary operation.

The micrometer 300 to be employed in the present exemplary embodiment preferably includes a constant pressure mechanism between the thimble part 340 and the spindle 330. The constant pressure mechanism disengages the thimble part 340 and the spindle 330 when a preset load is applied to the spindle 330, thereby causing the thimble part 340 to idle against the spindle 330. By constantly activating the constant pressure mechanism in the same proper manner during measurement, a measurement pressure during measurement can be kept constant, and the measurement accuracy (repeatability) can be kept high. The constant pressure mechanism is incorporated in a commercially available micrometer 300 and is disclosed in JP 3115555 B, JP 3724995 B, JP 5426459 B, and JP 5270223 B. The constant pressure mechanism can be constituted by a ratchet mechanism that allows slippage to occur when a force above a predetermined load is applied between the thimble part 340 and the spindle 330, or a plate spring interposed between an outer sleeve and an inner sleeve of the thimble part 340 to allow slippage to occur above a predetermined load.

The micrometer 300 to be employed in the present exemplary embodiment preferably includes a measurement-pressure detection mechanism that detects the load applied to the spindle 330. For example, such a measurement-pressure detection mechanism is disclosed in JP 3751540 B, JP 4806545 B, and JP 2019-190916 A. The measurement-pressure detection mechanism may directly or indirectly detect the load applied to the spindle 330 with a strain gauge or the like, or may detect that the load applied to the spindle 330 has reached a predetermined value based on the activation of the constant pressure mechanism. The measurement-pressure detection mechanism outputs a signal (measurement pressure signal) when detecting a predetermined measurement pressure. For example, the displacement detection part 350 performs sampling (latching) of a measurement value (displacement) in response to the detection of the predetermined measurement pressure by the measurement-pressure detection mechanism.

The displacement detection part 350 detects the displacement (or position) of the spindle 330. The displacement detection part 350 is constituted by a rotary encoder or linear encoder.

The displacement detection part 350 may be an analog type (scale type) instead of an encoder. In this case, for automation, the scale may be read by the digital camera 150 or the like, and the measurement value may be read by image analysis (image recognition). In this case, the displacement detection part 350 may be constituted by an analog-type scale, the digital camera 150, and an image recognition unit (image analysis unit).

In addition, the U-shaped frame 310 includes a display panel 311 for displaying a measurement value and switches for operation on its front face. The U-shaped frame 310 further has a measurement value output function for outputting the measurement value externally via wired or wireless communication as a function of a built-in electric circuit.

Next, the measuring-device support frame part 400 is described. The measuring-device support frame part 400 includes a base frame 410 and a measuring-device holding part 420.

The base frame 410 is a rectangular frame as a whole. For the sake of explanation, mutually orthogonal XYZ coordinate axes are taken as shown in FIG. 2. Of the four sides constituting the base frame 410, the two sides parallel to the X axis direction are a first long side part 411 and a second long side part 412, and the two sides parallel to the Y axis direction are a first short side part 413 and a second short side part 414.

The first long side part 411, the second long side part 412, the first short side part 413, and the second short side part 414 are desirably stretchable to adjust their lengths. This allows the size of the base frame 410 to be adjusted according to the size of the micrometer 300 or the workpiece W.

The measuring-device holding part 420 is installed on the first long side part 411, the automatic operation part 500 is installed on the second short side part 414, and the workpiece holding base part 460 is installed on the second long side part 412. The first long side part 411 has a rail to allow the installation position of the measuring-device holding part 420 to be adjusted along the X-axis direction. Similarly, the second short side part 414 has a rail to allow the installation position of the automatic operation part 500 to be adjusted along the Y-axis direction. The second long side part 412 has a rail to allow the installation position of the workpiece holding base part 460 to be adjusted along the X-axis direction.

Figure 3:
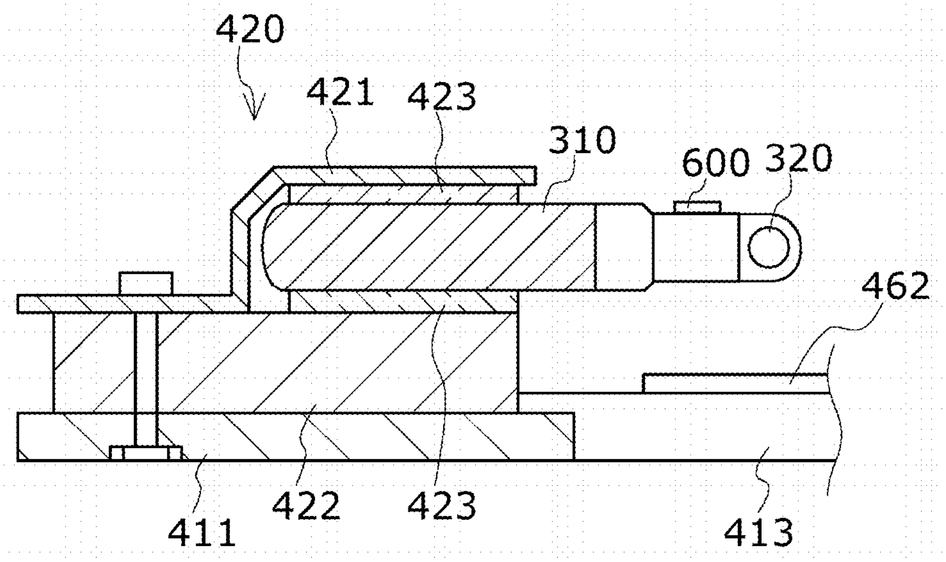
FIG. 3 is a cross-sectional view of a measuring-device holding part.

The measuring-device holding part 420 is fixedly attached to the first long side part 411. The measuring-device holding part 420 sandwiches the micrometer 300 between upper and lower clamping pieces to attach the micrometer 300 to the base frame 410 (first long side part 411). FIG. 3 is a cross-sectional view of the measuring-device holding part 420.

The measuring-device holding part 420 includes a first clamping piece 421 and a second clamping piece 422, and the first clamping piece 421 and the second clamping piece 422 each have an elastic rubber sheet 423 as a cushioning material on the surfaces facing each other. In addition to elastic rubber, the cushioning material may be a foam resin, a spring, or an air-sealed bag (for example, an air cap). The cushioning material has enough cushioning to not inhibit vibration when vibration is applied to the micrometer 300 by the vibration motor 600, which will be described later. Alternatively, the clamping pieces 421 and 422 may be thin plates, and the clamping pieces 421 and 422 themselves may have elasticity to hold the measuring device (micrometer 300). The U-shaped frame (fixed element) 310 of the micrometer (measuring device) 300 is clamped between the first clamping piece 421 and the second clamping piece 422. The orientation of the micrometer 300 is as follows: the forward/backward movement direction (axial direction) of the spindle 330 is parallel to the X axis, the one end side (anvil 320 side) of the U-shaped frame 310 faces the first short side part 413, and the other end side (thimble side) of the U-shaped frame 310 faces the second short side part 414.

The automatic operation part 500 automates the forward/backward movement of the spindle (movable element) 330 by the power of a motor 520.

The automatic operation part 500 includes a motor housing 510, a motor 520, and a power transmission part 530.

The motor housing 510 houses the motor 520 and a motor controller. The motor housing 510 is disposed on an extension of the centerline of the spindle 330 (or the thimble part 340) of the micrometer 300. In other words, the automatic operation part 500 is installed in such a manner that the rotation axis of the rotor of the motor 520 is on the same line as the center axis of the spindle 330 (or the thimble part 340). If necessary, the position of the motor housing 510 may be adjusted by moving the motor housing 510 along the rail of the second short side part 414.

The motor 520 may be a normal electric motor that extracts the rotation of the rotor to the output shaft. However, the motor 520 is preferably capable of controlling the rotation angle (the number of revolutions) of forward and reverse rotation to some extent by control pulses. In addition, the motor 520 preferably has a torque detection function. (Various methods are known for detecting the torque of the motor 520, such as determining the torque from the increase or decrease in the applied current (applied voltage).) A stepping motor can be used as the motor 520. (Needless to say, a servo motor or a synchronous motor is also applicable, and the structure and drive system of the motor 520 are not particularly limited.)

The power transmission part 530 includes a fastening ring 531 that fits onto the thimble part 340, a rotating plate 532 provided to rotate in synchronization with the rotation axis of the rotor of the motor 520, and a transmission link rod 533 that connects the fastening ring 531 and the rotating plate 532. One end of the transmission link rod 533 is fixed to the fastening ring 531 and the other end is fixed to the rotating plate 532. The transmission link rod 533 is parallel to the center axis of the spindle 330. When the rotating plate 532 is rotated by the motor 520, the rotation is transmitted to the fastening ring 531 through the transmission link rod 533, and the fastening ring 531 is rotated in synchronization with the rotating plate 532.

The workpiece holding base part 460 holds the workpiece W to be measured in the measurement area of the micrometer (measuring device) 300. The workpiece holding base part 460 includes a supporting column 461 and a workpiece placing plate 462. The supporting column 461 is attached to the first long side part 411. The workpiece placing plate 462 is an L-shaped plate having a plane parallel to the XY plane, and is fixed to the supporting column 461. The position of the supporting column 461 is adjusted along the second long side part 412 in order for the workpiece W held by the workpiece holding base part 460 to be in the measurement area of the micrometer (measuring device) 300, and the height (position in the Z-axis direction) of the workpiece placing plate 462 is adjusted in order for a part to be measured of the workpiece W to be sandwiched between the anvil 320 and the spindle 330.

The surface of the workpiece placing plate 462 on which the workpiece W is placed is flat, and the workpiece W placed on and held by this placing surface easily changes its position and posture when pushed by the spindle 330. In other words, when the spindle 330 comes into contact with the workpiece W, the workpiece W is pushed toward the anvil 320 and slides on the placing surface until the workpiece W comes into contact with the anvil 320. Then, when the workpiece W comes into contact with the anvil 320, the movement of the workpiece W is restricted, and the workpiece W is sandwiched between the anvil 320 and the spindle 330. At this time, the workpiece W changes its posture, causing the measuring surface of the anvil 320 and the contact surface of the workpiece W to be in close contact and the measuring surface of the spindle 330 and the contact surface of the workpiece W to be in close contact. In this manner, the workpiece W is not fixed and is allowed to move to some extent on the placing surface, which allows the part to be measured of the workpiece W to be sandwiched between the anvil 320 and the spindle 330 without any gap.

If the friction of the placing surface of the workpiece placing plate 462 is too small, the workpiece W can slip and fall down when placed by the robot hand 140 or a human hand, or deviate from the orientation or posture in which it was placed, and the placing surface of the workpiece placing plate 462 is desirably unevenly machined to generate some friction with the workpiece W. The placing surface is desirably machined to allow the workpiece W to change its position and posture when a force less than a set measurement pressure (about 1 N to 5 N) is applied to the workpiece W while the workpiece is on the placing surface.

The vibration motor (vibration actuator) 600 is attached to the micrometer 300. Here, the vibration motor 600 is attached to one end surface of the U-shaped frame 310 of the micrometer 300, but the vibration motor 600 can be attached to any position of the micrometer 300 (measuring device), and may be attached to the spindle side frame of the micrometer 300. In the exemplary embodiment, the vibration motor 600 is attached to the outer surface of the micrometer 300 (measuring device) because the commercially available micrometer 300 is to be used in the automatic measuring apparatus 100 in its original form, but the vibration motor 600 may be embedded in an electronic unit or frame part. The vibration actuator is only required to generate vibration, and may be a what is called an eccentric motor, a piezoelectric actuator, a rotary vibration actuator, or a linear vibration actuator. The vibration motor 600 may incorporate a dedicated small battery, or may be powered by the micrometer 300. The vibration motor 600 is connected to the control unit 800 via a wireless or wired connection and is driven by control signals from the control unit 800.

The control unit 800 includes an arithmetic unit and a memory device that are constituted by a computer including a central processing unit (CPU), a read-only memory (ROM), and a random access memory (RAM), and a motor drive circuit that generates drive signals (voltage signals or current signals) and applies them to the motor 520. The control unit 800 controls the rotational drive of the motor 520 to control the forward/backward movement of the spindle 330. The control unit 800 further drives the vibration motor 600 at an appropriate timing to facilitate a change in the posture of the workpiece W. In addition, the control unit 800 also samples measurement values from the micrometer 300 (displacement detection part 350) at an appropriate timing. The control operation of the control unit 800 will be described later with reference to a flowchart.

Explanation of Operation

The operation of the automatic micrometer device 200 is described below.

Figure 4:
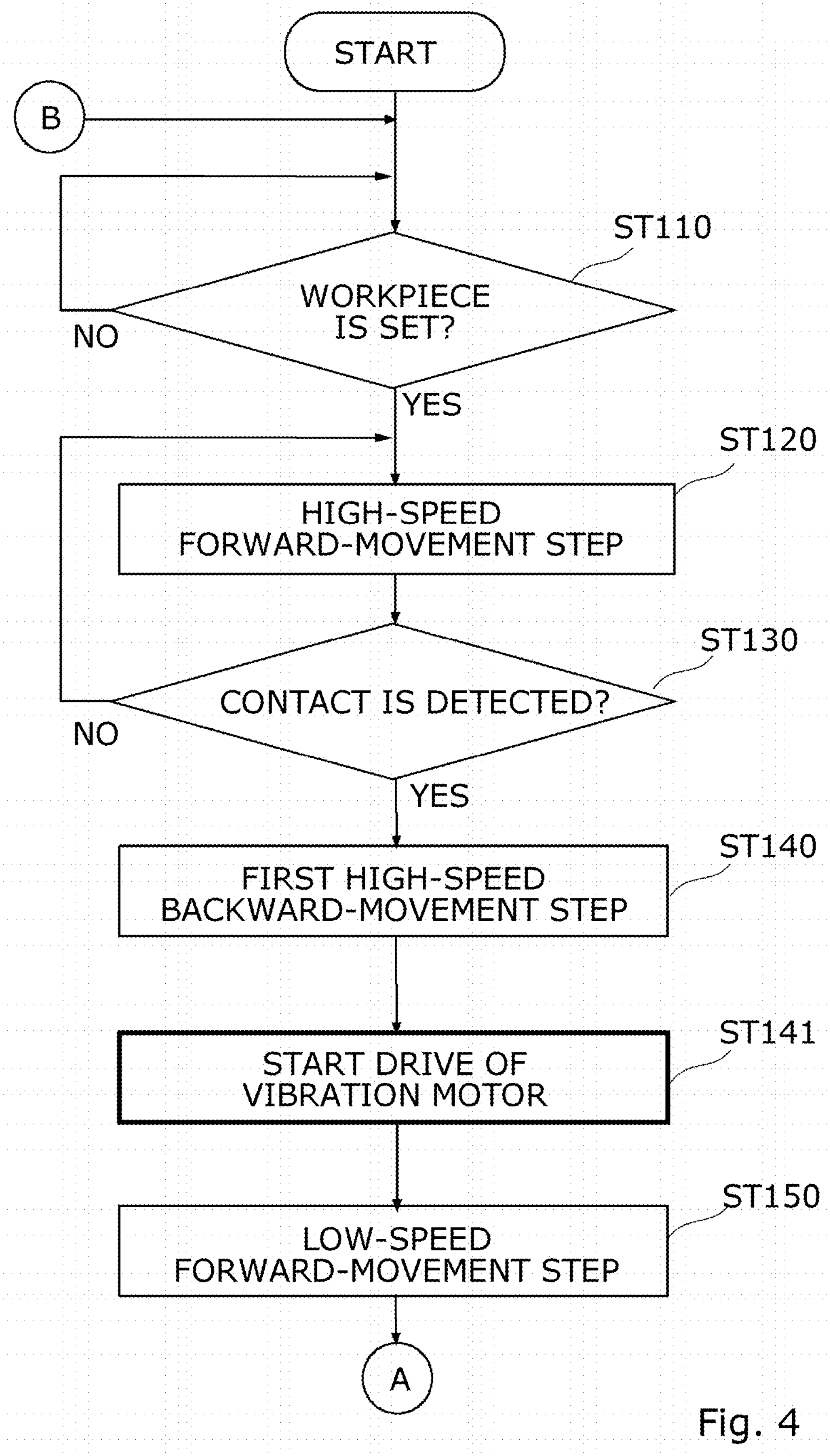
FIG. 4 is a flowchart for explaining a measurement operation of the automatic micrometer device.
Figure 5:
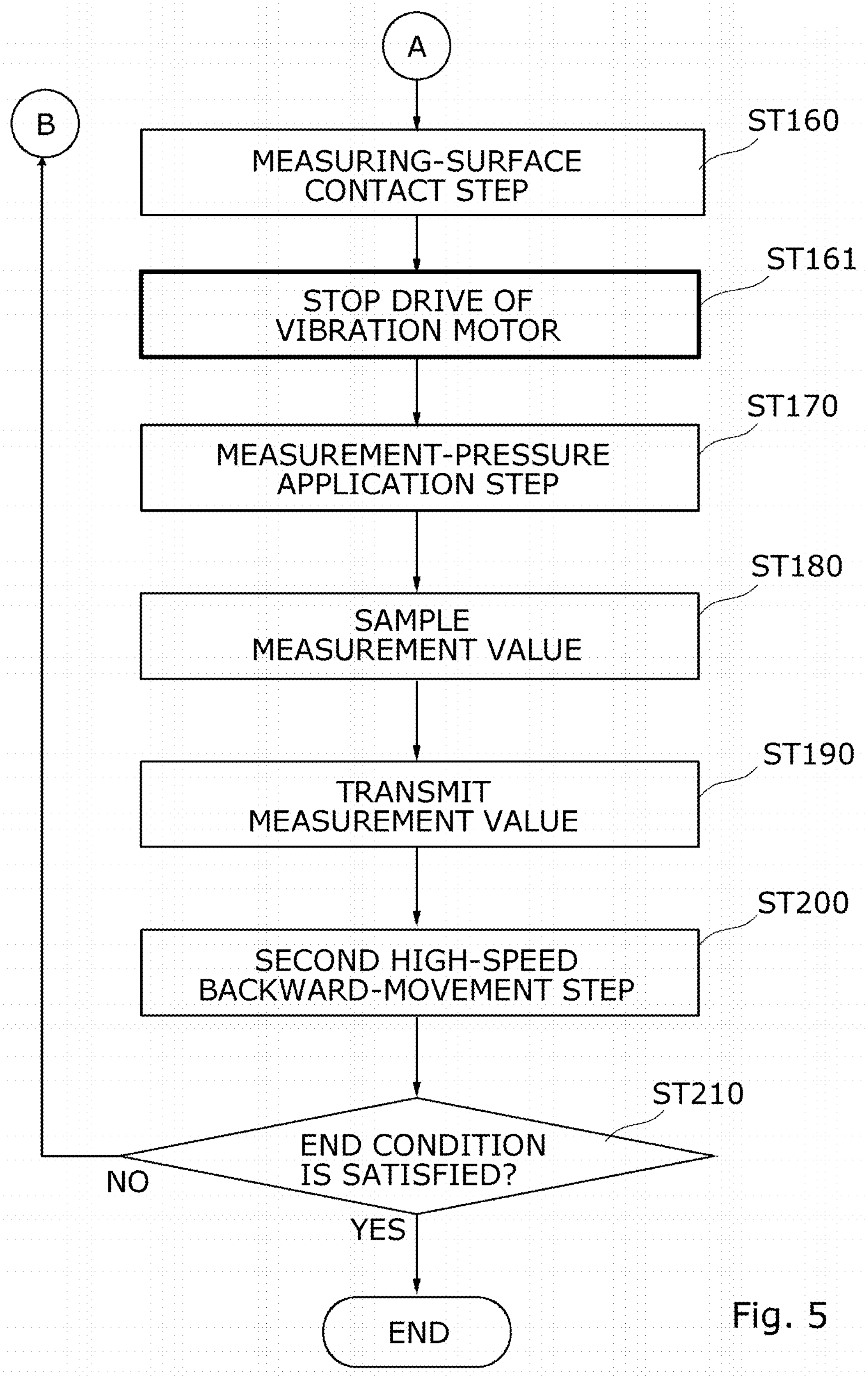
FIG. 5 is a flowchart for explaining the measurement operation of the automatic micrometer device.

FIGS. 4 and 5 are flowcharts for explaining the measurement operation of the automatic micrometer device 200.

Figure 6:
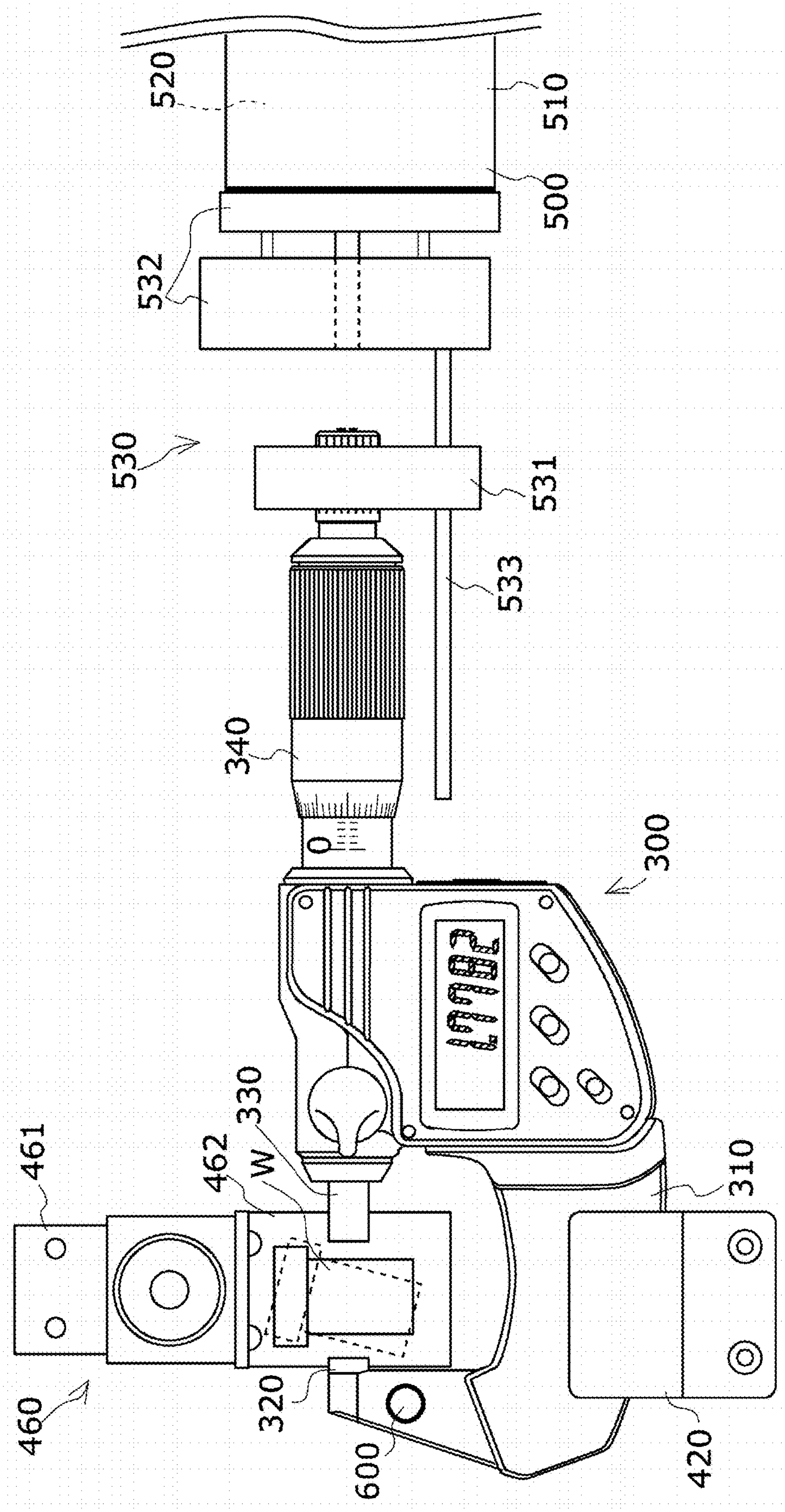
FIG. 6 is a view showing an example of a spindle moving forward.

When detecting that the workpiece W is set on the workpiece placing plate 462 by the robot arm part 130 (ST110: YES), the control unit 800 performs preset (programmed) motor drive control. The control unit 800 rotates the motor 520 forward at a relatively high speed to move the spindle 330 forward toward the anvil 320 (ST120). The rotational speed of the motor 520 at this time is, for example, 180 rpm (or about 100 rpm to 200 rpm). FIG. 6 shows an example of the spindle 330 moving forward.

In ST120, it is desirable to increase the rotational speed as high as possible in terms of reducing a measurement time. However, if the rotational speed is too high, the workpiece W can be damaged when the spindle 330 comes into contact with the workpiece W. In addition, if the rotational speed is too high, the centrifugal force generated in the power transmission part 530 becomes high, and which makes the motor torque large. Then, due to the configuration of detecting the contact between the spindle 330 (anvil 320) and the workpiece W by the magnitude of the torque, the torque detection function can erroneously detect the contact between the spindle 330 (anvil 320) and the workpiece W. Therefore, it is desirable to first set a torque threshold for detecting the contact between the spindle 330 and the workpiece W, and then rotate the motor 520 at a speed that does not exceed this torque threshold.

As the spindle 330 moves forward toward the anvil 320, the spindle 330 comes into contact with the workpiece W. Since the workpiece W is not fixed on the workpiece placing plate 462, the workpiece W is pushed by the spindle 330 and brought into contact with the anvil 320.

Figure 7:
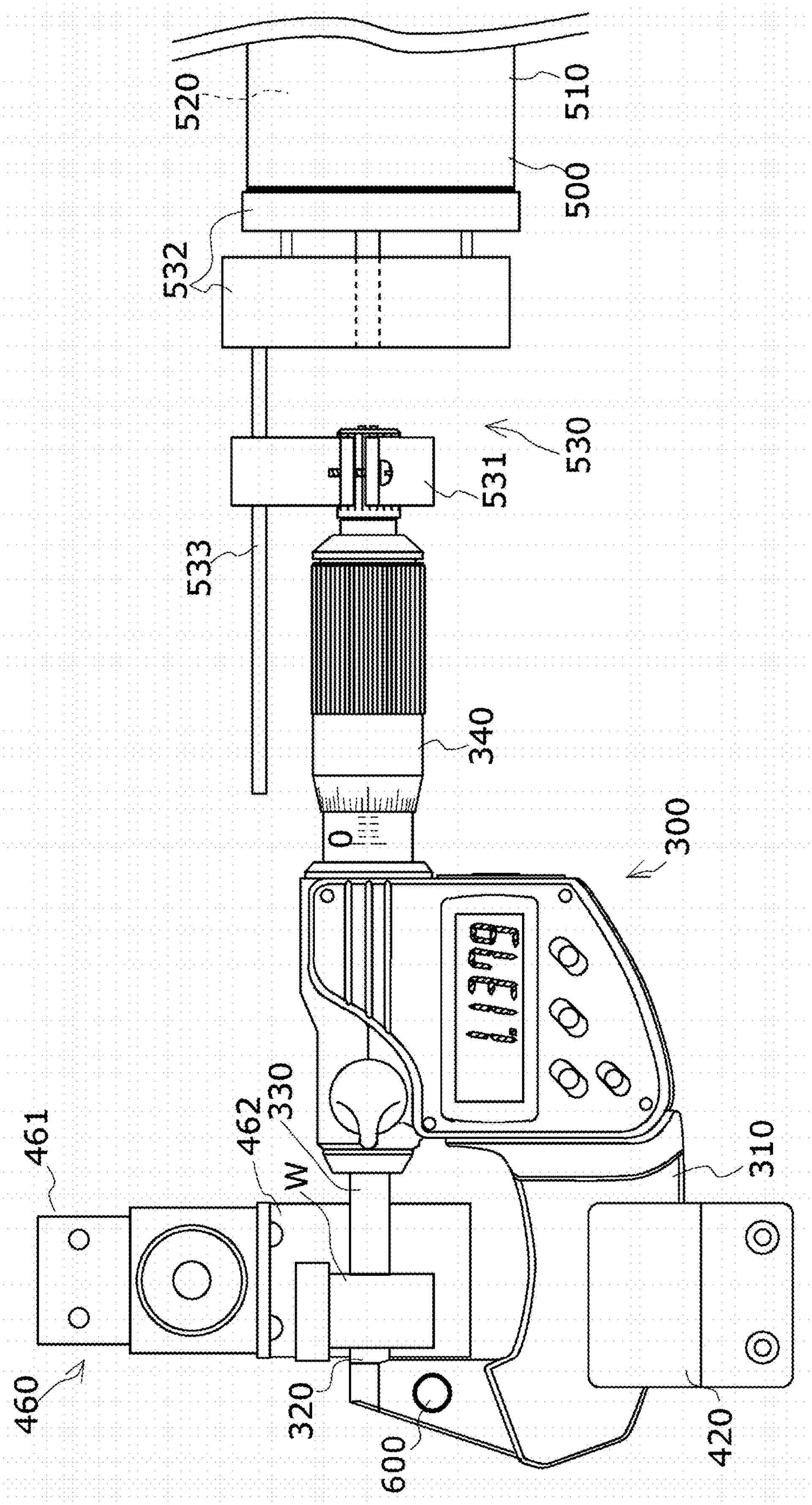
FIG. 7 is a view showing an example of a workpiece W sandwiched between an anvil and the spindle.

FIG. 7 is a view showing an example of the workpiece W sandwiched between the anvil 320 and the spindle 330. At the moment when the workpiece W is sandwiched between the anvil 320 and the spindle 330, the motor torque increases, and the motor controller detects, through the torque detection function, that the spindle 330 has come into contact with the workpiece W, in other words, that the anvil 320 and the spindle 330 have come into contact with the workpiece W (ST130: YES).

When detecting that the spindle 330 has come into contact with the workpiece W, the control unit 800 immediately rotates the motor 520 in reverse for a predetermined number of revolutions at a relatively high speed to move the spindle 330 backward (ST140). The number of the reverse rotation revolutions is, for example, 180 rpm. The number of the reverse rotation revolutions is, for example, 0.5 rpm. This rotational speed (180 rpm) is an example, and the rotational speed during the forward movement (ST120) may be the same as or different from the rotational speed during the reverse rotation (ST140).

Here, the spindle 330 is not “stopped” or “slowed down”, but is desirably moved backward once with a relatively high reverse rotation. The first reason is to ensure that the spindle 330 does not dig into the workpiece W. Transmitting a control signal to move the spindle 330 backward once rather than simply stopping the spindle 330 ensures that the spindle 330 does not dig into the workpiece W. Although the constant pressure mechanism is activated when the measurement pressure is generated, it is necessary to secure the operating distance of the spindle 330 in order to activate the constant pressure mechanism while the spindle 330 is constantly moved forward at the same speed. For this reason, it is desirable to move the spindle 330 backward once to ensure the same operation of applying the measurement pressure to the workpiece W at all times.

Then, the spindle 330 is moved forward again to bring the spindle 330 in close contact with the workpiece W at the predetermined measurement pressure (ST150, ST160). At this time, the vibration motor 600 is driven in conjunction with the forward re-movement of the spindle 330 (ST141). In other words, after the first high-speed backward movement step (ST140) and before the start of the low-speed forward movement step (ST150), the control unit 800 starts the drive of the vibration motor 600 (ST141).

The motor 520 is rotated forward at a relatively low speed to move the spindle 330 forward toward the anvil 320 (ST150, ST160). As the low-speed forward movement step (ST150), the motor 520 is rotated forward at a relatively low speed. The number of revolutions is the same as that in the previous backward movement (ST140).

Here, 0.5 revolutions at 9 rpm are used, for example. The workpiece W is slowly pushed to ensure the contact between the workpiece W and the anvil 320 and between the workpiece W and the spindle 330. At this time, the vibration of the vibration motor 600 is transmitted to the micrometer 300, causing the spindle 330 and the anvil 320 to vibrate slightly. This reduces the friction at the interface between the workpiece W and the spindle 330 and between the workpiece W and the anvil 320, and facilitates a change in the posture of the workpiece W.

Then, as a measuring-surface contact step (ST160), the motor 520 is rotated forward at a relatively low speed (ST160). The number of revolutions is assumed to be, for example, equivalent to the number of revolutions of the thimble part 340 (the number of revolutions of the spindle 330) corresponding to the time from when the workpiece W comes into contact with the anvil 320 and the spindle 330 until the constant pressure mechanism is activated. Here, 0.5 revolutions at 9 rpm are used. (This is the same as ST150, but the rotational speed and the number of revolutions may be appropriately changed.) Here, the constant pressure mechanism is slowly activated once to ensure that the contact surfaces between the workpiece W and the anvil 320, and the contact surfaces between the workpiece W and the spindle 330 are securely fitted with each other (brought into close contact with each other).

Now, the workpiece W is firmly sandwiched between the anvil 320 and the spindle 330 in this state. The drive of the vibration motor 600 is stopped (ST161).

As a measurement-pressure application step (ST170), the motor 520 is rotated forward at a relatively high speed. For example, 3 revolutions at 180 rpm are used. At this time, the constant pressure mechanism is activated again, and the predetermined measurement pressure is applied.

Note that, the motor rotational speed in this step (ST170) may be higher (for example, 150 rpm to 250 rpm). Since the contact surfaces between the workpiece W and the spindle 330 have been fitted in the previous step (ST160), the contact surfaces between the spindle 330 (anvil 320) and the workpiece W are now firmly fitted. Therefore, it is unlikely that the spindle 330 (anvil 320) digs into the workpiece W. In addition, since the spindle 330 (anvil 320) and the workpiece W are already in contact with each other, there is no such limitation that will cause the torque detection function to erroneously detect the contact between the spindle 330 (anvil 320) and the workpiece W. The number of revolutions in this step (ST170) is the number of revolutions required to activate the constant pressure mechanism, which is about 1.5 to 3.5 revolutions and depends on the specifications of the micrometer 300 (constant pressure mechanism) to be used.

At the moment when the constant pressure mechanism is activated in the measurement-pressure application step (ST170), the micrometer 300 samples a measurement value (ST180). The sampled measurement value (measurement data) is output externally via wired or wireless communication, and the measurement data is collected and processed by an external personal computer (PC) or a data processing device via the control unit 800.

Up to this point, one measurement value has been acquired, the control unit 800 rotates the motor 520 in reverse at a relatively high speed to move the spindle 330 backward. This measurement operation is continued while the workpiece W is replaced.

With the automatic measuring apparatus 100 according to the present exemplary embodiment, it is possible to almost automate the measurement operation for the workpiece W. The automatic micrometer device 200 according to the present exemplary embodiment automates the micrometer 300, which is a small-sized measuring device (small-sized measuring tool). Since it is expected that a typical factory already owns the micrometer 300, automation of the micrometer 300 can be achieved simply by preparing the measuring-device support frame part 400, the workpiece holding base part 460, the automatic operation part 500, and the vibration motor 600. In other words, the cost required to introduce automatic measurement can be kept extremely low, which contributes greatly to reducing labor shortages.

The micrometer 300 is a contact type and has extremely high measurement stability. In addition, the micrometer 300 has a long history and is widely used in the world, making it the most familiar measuring device for measurement operators. Therefore, operators are fully familiar with the necessary handling of the micrometer 300, such as calibration work, and there is almost no need to learn or train difficult work procedures.

Various automatic measuring apparatuses have been proposed in the past, but most of them used non-contact measuring tools. For example, many of them used air micrometers, laser scan micrometers, or the like. However, such non-contact measurement devices are extremely expensive and somewhat difficult to maintain. In this respect, the automatic micrometer device 200 according to the present exemplary embodiment that can automate the micrometer 300 has the advantage of being inexpensive and easy to handle.

One of the reasons why it has been difficult to automate the micrometer 300, which is a representative of small-sized measuring devices (small-sized measuring tools), is that it was difficult to properly sandwich the workpiece W from both sides and fit the contact surfaces (measuring surfaces). In this respect, the relative position between the workpiece W and the micrometer 300 is not fixed in the present exemplary embodiment, and the position and posture can be changed by a force lower than the measurement pressure. In addition, the constant pressure mechanism in the micrometer 300 and the torque detection mechanism in the motor 520 are comprehensively used to move the spindle 330 forward and backward in several steps. In particular, the step of firmly fitting (being in close contact between) the measurement surfaces (contact surfaces) (ST160) and the step of applying the predetermined measurement pressure (ST170) are performed. Furthermore, the vibration motor 600 is driven at an appropriate timing to facilitate a change in the posture of the workpiece W, which ensures the close contact between the workpiece W and the spindle 330 and between the workpiece W and the anvil 320. Normally, when a thimble is manually rotated, a measurement is performed by rotating the thimble at a constant speed and applying a constant pressure at the same constant rotation, but not by moving the thimble backward or by operating the constant pressure mechanism in two slow and fast stages. However, through repeated experiments under different conditions, control steps different from the manual operation have been devised, and it is possible to acquire stable measurement values even in automatic measurement. This makes it possible to automate the micrometer 300. In addition, the workpiece W can always be measured with the same operation by the motor control, and this eliminates a problem of differences in measurement values caused by the skill level or movement habits of each operator.

Although the contact between the workpiece W and the spindle 330 is detected by torque detection, the contact between the spindle 330 (movable element) and the workpiece W can also be detected by the displacement detection part 350 from a detection value. For example, by contrasting the number of times drive pulses are transmitted to the motor 520 with the displacement of the spindle 330, it may be determined that the spindle 330 comes into contact with the workpiece W when the spindle 330 stops without moving forward as expected for a predetermined number of consecutive times.

Although the vibration motor 600 installed on the measuring device (micrometer) is described as an example, the vibration motor may be installed on the workpiece holding base part to provide vibration to the workpiece W. Alternatively, the vibration motor may be installed on both the measuring device and the workpiece holding base part.

Second Exemplary Embodiment

A second exemplary embodiment of the present invention is described below.

The present exemplary embodiment describes an automatic inside-diameter measuring apparatus 2100 that automates measurement of the inside diameter (hole diameter) of a hole to be measured.

(Automatic Inside-diameter Measuring Apparatus 2100)

Figure 8:
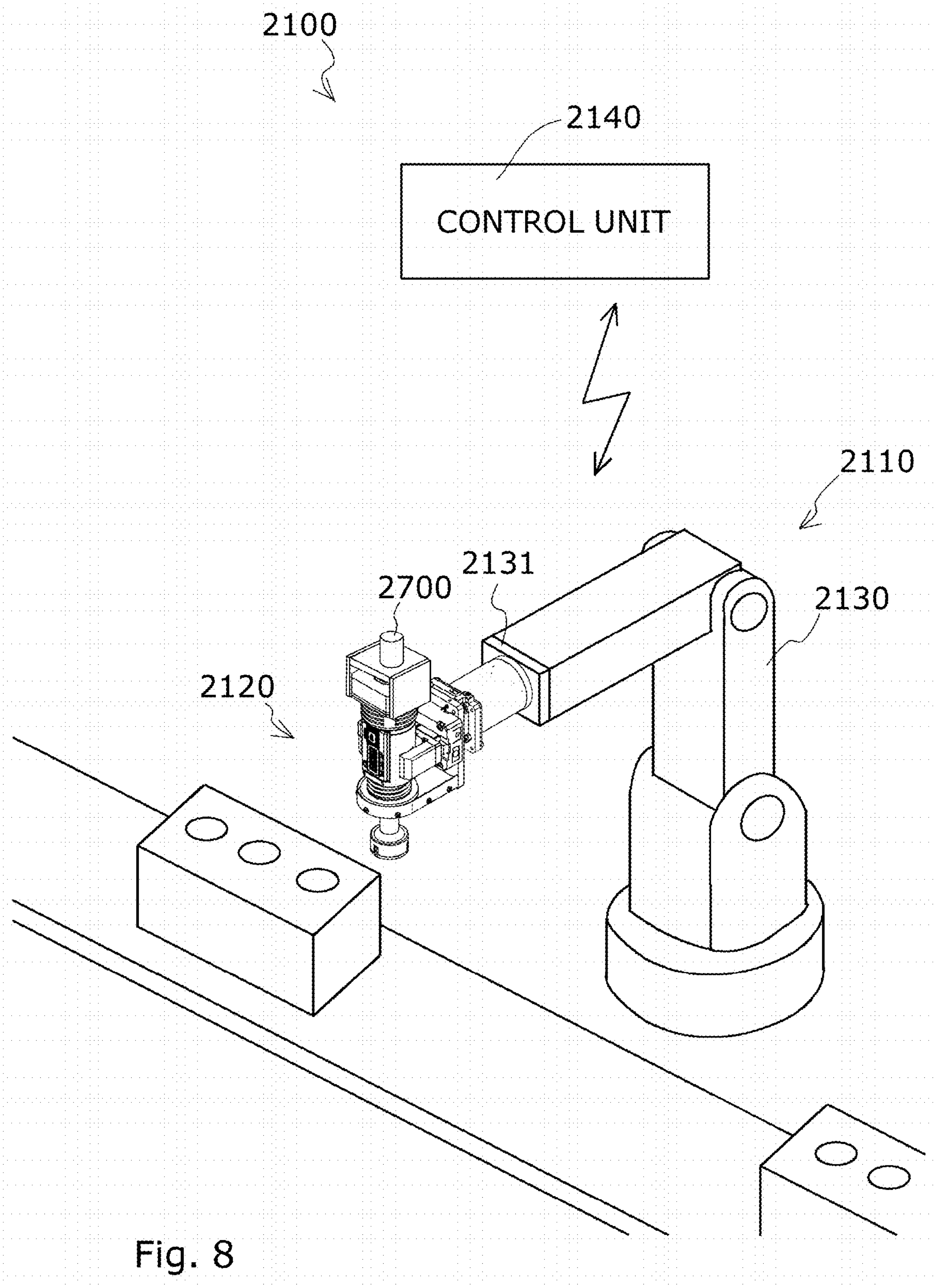
FIG. 8 is an overall external view of an automatic inside-diameter measuring apparatus according to a second exemplary embodiment.

FIG. 8 is an overall external view of the automatic inside-diameter measuring apparatus 2100.

The automatic inside-diameter measuring apparatus 2100 includes a measuring-apparatus main body 2110 and a control unit 2140 that controls the overall operation.

(Measuring-Apparatus Main Body)

The measuring-apparatus main body 2110 includes an electric inside-diameter measuring unit 2120 that measures the diameter of a hole to be measured and an articulated robot arm part 2130 as a moving means to move the electric inside-diameter measuring unit 2120.

(Electric Inside-Diameter Measuring Unit 2120)

The electric inside-diameter measuring unit 2120 is attached to and held by a hand part 2131, which is the tip of the robot arm part 2130. The electric inside-diameter measuring unit 2120 is inserted into the inside of a hole to be measured to acquire a measurement value of the inside diameter. The electric inside-diameter measuring unit 2120 further has a function for autonomously adjusting its own position and posture to accurately measure the hole to be measured.

The configuration of the electric inside-diameter measuring unit 2120 is described.

Figure 9:
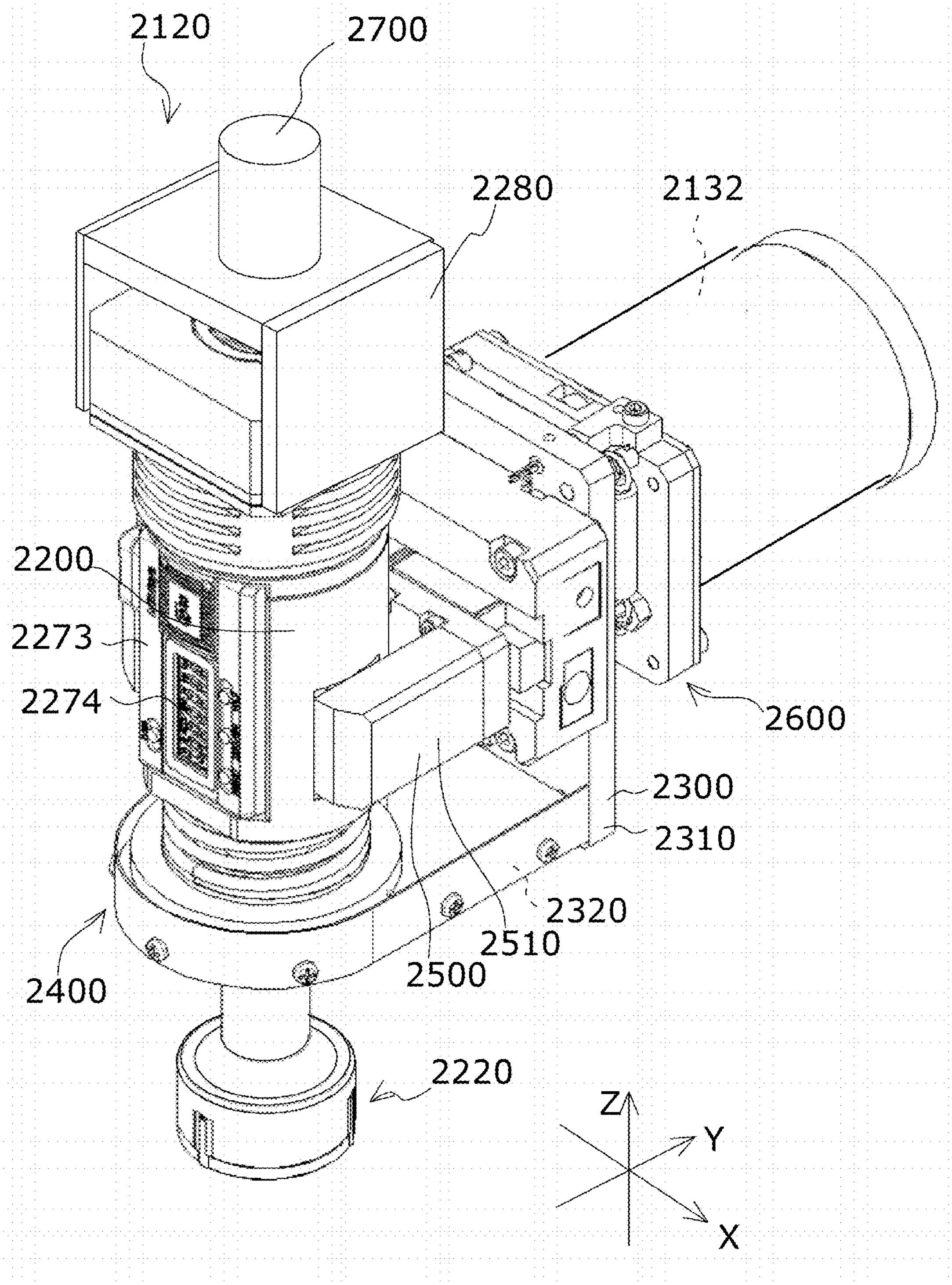
FIG. 9 is an external perspective view of an electric inside-diameter measuring unit when viewed from a slightly front side.

FIG. 9 is an external perspective view of the electric inside-diameter measuring unit 2120 from a slightly front side.

Figure 10:
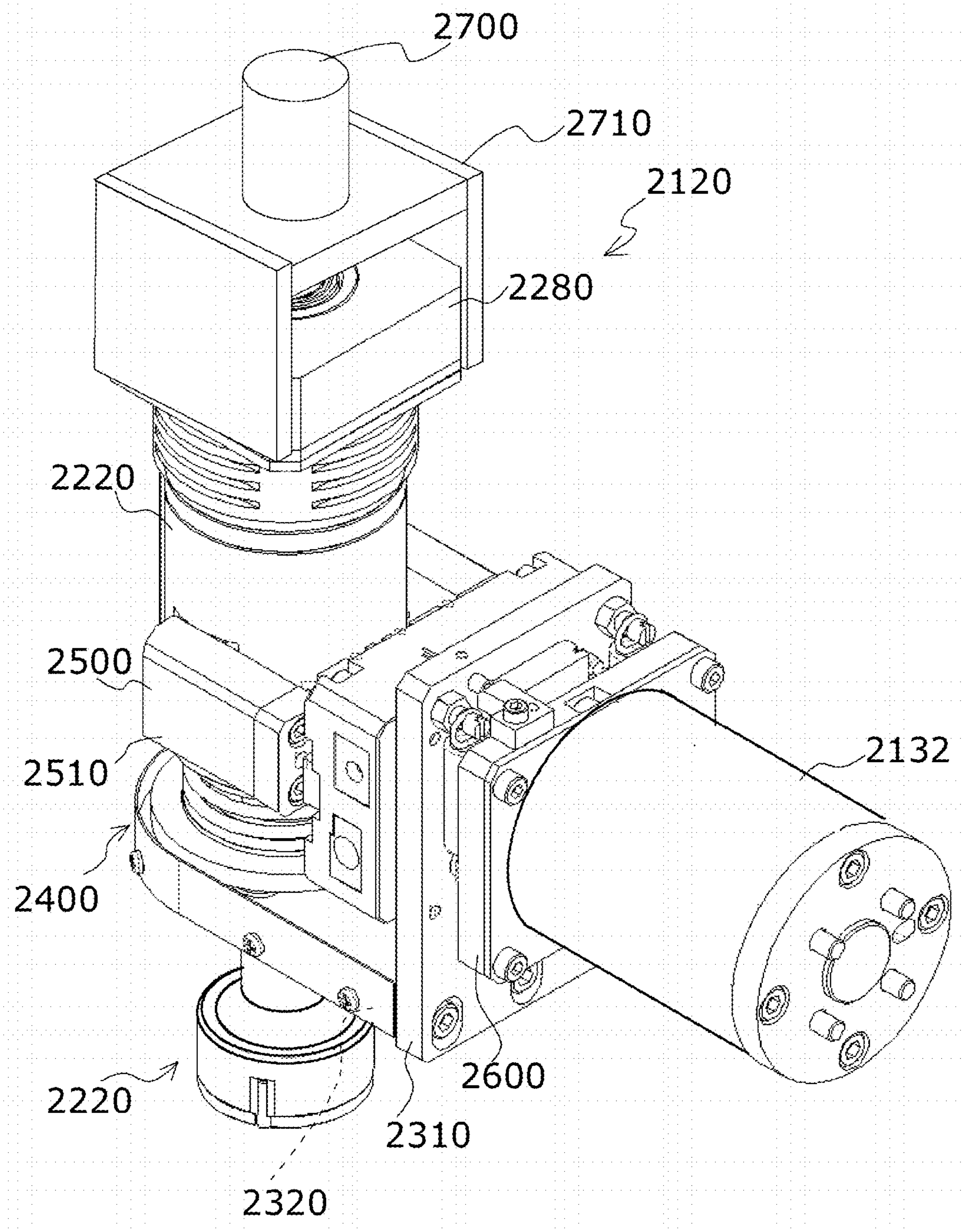
FIG. 10 is an external perspective view of the side of the electric inside-diameter measuring unit when viewed from a slightly rear side.

FIG. 10 is an external perspective view of the side of the electric inside-diameter measuring unit 2120 from a slightly rear side.

Figure 11:
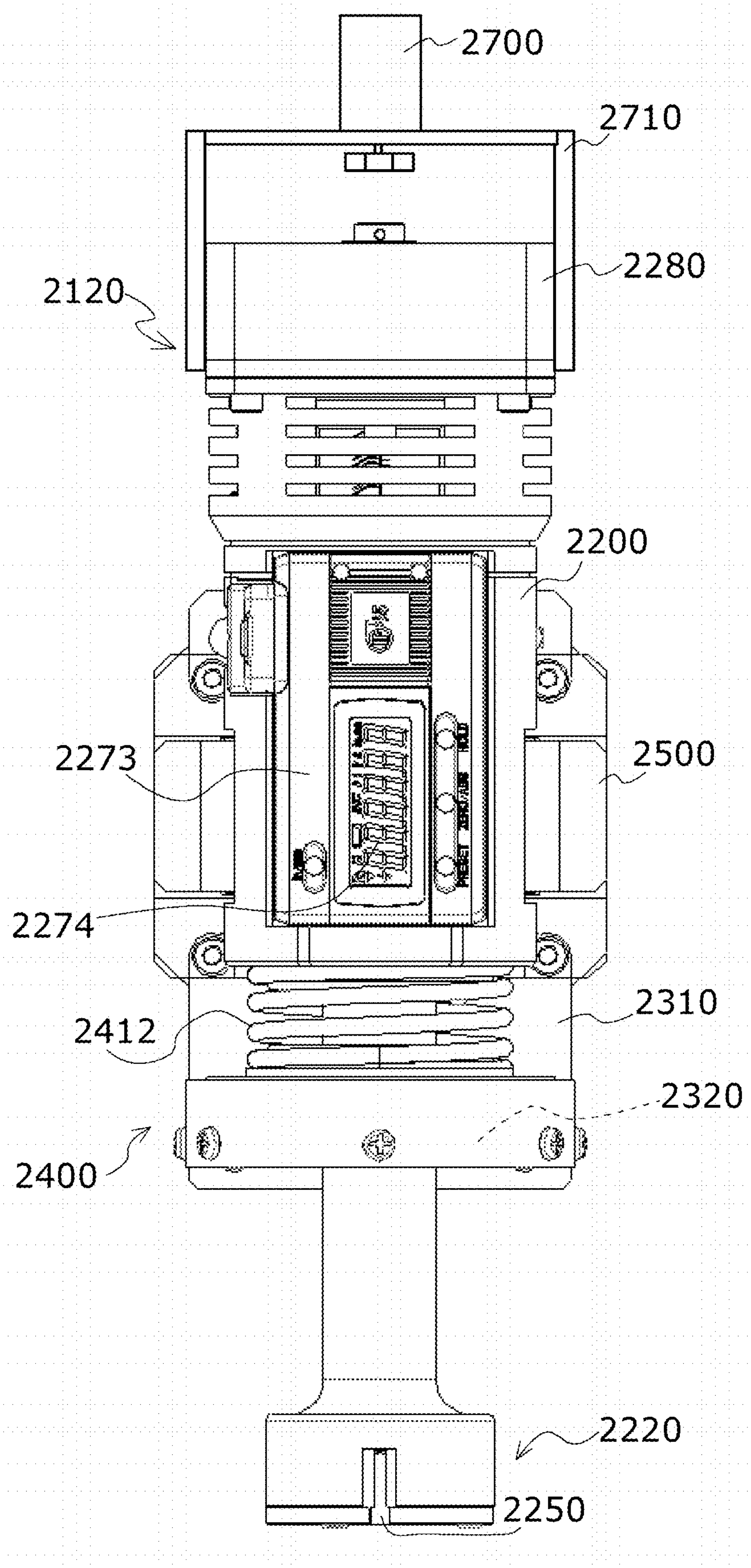
FIG. 11 is a front view of the electric inside-diameter measuring unit.

FIG. 11 is a front view of the electric inside-diameter measuring unit 2120.

The electric inside-diameter measuring unit 2120 includes an electric inside-diameter measuring device 2200, a measuring-device support frame part 2300, a floating joint part (floating joint mechanism part) 2400, a restriction means 2500, a collision detection part 2600, a force sensor part 2132, and a vibration motor (vibration actuator) 2700.

(Electric Inside-Diameter Measuring Device 2200)

The electric inside-diameter measuring device 2200 is an existing manual inside-diameter measuring device (for example, Hole test) whose rod feed is motorized.

Figure 12:
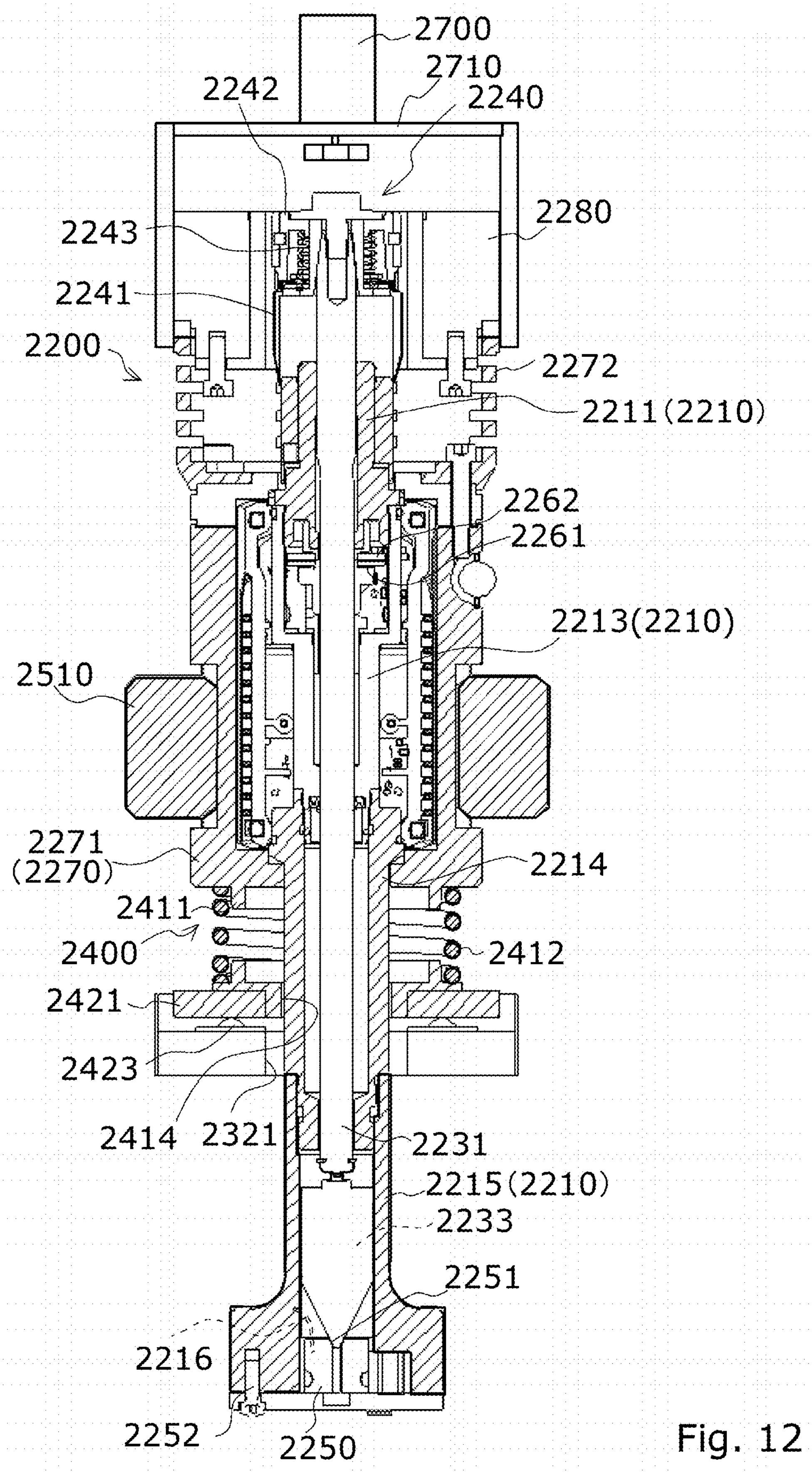
FIG. 12 is a cross-sectional view of the internal structure of an electric inside-diameter measuring device.

FIG. 12 is a cross-sectional view of the internal structure of the electric inside-diameter measuring device 2200.

The electric inside-diameter measuring device 2200 includes a cylinder case part (fixed element) 2210, a rod 2230, a thimble part 2240, a contact point (movable element) 2250, a displacement detection part 2260, an outer case part 2270, a display unit 2273, and an electric drive unit (automatic operation part) 2280.

The cylinder case part 2210 is a case having a cylindrical shape as a whole.

The rod 2230 moves axially forward and backward inside the cylinder case part 2210. The cylinder case part 2210 includes an upper cylinder case part 2211 constituting an upper part, a middle cylinder case part 2213 constituting a middle part, a lower cylinder case part 2214 constituting a lower part, and a head cylinder part 2215 constituting a measuring head part 2220. The middle cylinder case part 2213 is attached to the lower end of the upper cylinder case part 2211, the lower cylinder case part 2214 is attached to the lower end of the middle cylinder case part 2213, and the head cylinder part 2215 is attached to the lower end of the lower cylinder case part 2214.

The rod 2230 is a longitudinal rod-shaped body as a whole. The rod 2230 includes an upper rod 2231 and a lower rod 2233. The upper rod 2231 is a spindle and has a feed screw (male thread) on the outer surface of its base end (upper end side). The upper cylinder case part 2211 has a female thread, and the feed screw is screwed with the female thread.

The thimble part 2240 is provided at the base end (upper end side) of the upper rod 2231. The thimble part 2240 includes a thimble sleeve 2241, a ratchet sleeve 2242, and a coil spring 2243. The thimble sleeve 2241 is fitted externally to the base end of the upper rod 2231 (rod 2230) by the fit of a tapered surface 2251 and is adhered to the base end of the upper rod 2231 (rod 2230). The ratchet sleeve 2242 is a cylindrical body provided above the thimble sleeve 2241, and the coil spring 2243 is interposed between the thimble sleeve 2241 and the ratchet sleeve 2242. A push screw is screwed onto the base end face of the upper rod 2231, and the ratchet sleeve 2242 is pushed by the head flange of the push screw. At this time, the coil spring 2243 is sandwiched between the ratchet sleeve 2242 and the thimble sleeve 2241.

Between the ratchet sleeve 2242 and the thimble sleeve 2241, a ratchet mechanism (not shown) is provided. Here, the rotation direction of the ratchet sleeve 2242, the thimble sleeve 2241, or the rod 2230 in the direction of feeding the rod 2230 downward (in the direction of protruding the contact point 2250) is a positive rotation direction. In contrast, the rotation direction of the ratchet sleeve 2242, the thimble sleeve 2241, or the rod 2230 in the direction of feeding the rod 2230 upward (the direction in which the contact point 2250 is moved backward) is a negative rotation direction. The ratchet mechanism allows the ratchet sleeve 2242 to idle against the thimble sleeve 2241 in the positive rotation direction, and does not allow the ratchet sleeve 2242 to idle in the negative rotation direction.

When the ratchet sleeve 2242 is subjected to (positive) rotary operation, the rotation of the ratchet sleeve 2242 is transmitted to the rod 2230 via the coil spring 2243 and the thimble sleeve 2241. There is an upper limit to the force (rotational force) transmitted from the ratchet sleeve 2242 to the rod 2230. That is, if an attempt is made to rotate the rod 2230 with a force exceeding the frictional force (static frictional force) acting between the ratchet sleeve 2242, the coil spring (load regulating elastic body) 2243, and the thimble sleeve 2241, the ratchet mechanism causes the ratchet sleeve 2242 to idle against the thimble sleeve 2241. The thimble part 2240 constitutes a constant pressure mechanism that regulates the upper limit of the force (measuring force) acting between an object to be measured and the contact point 2250. Conversely, a predetermined force (measuring force), which can be defined by the indentation amount of the push screw, is generated between the object to be measured and the contact point 2250, and when the contact point 2250 applies the predetermined force (measuring force) to the object to be measured, the reaction force is applied to the contact point 2250, that is, the electric inside-diameter measuring device 2200.

The lower rod 2233 is provided inside the head cylinder part 2215.

The upper end of the lower rod 2233 is in contact with the lower end of the upper rod 2231. The lower end of the lower rod 2233 is conical.

The contact point 2250 is provided in the head cylinder part 2215 to move forward and backward in a direction perpendicular to the axial direction of the rod 2230. Three contact points 2250 are provided at 120° intervals in the head cylinder part 2215. Each contact point 2250 has a thin round shaft tip 2252 made of carbide at its outer end. When each contact point 2250 moves forward in the protruding direction, the round shaft tip 2252 is brought into contact with the inner wall of the object to be measured.

The inner end side of each contact point 2250 is formed with a tapered surface 2251, and the tapered surface 2251 is brought into contact with the conical surface of the lower rod 2233. The conical surface of the lower rod 2233 and the tapered surface 2251 of each contact point 2250 constitute a displacement direction conversion means for changing the direction of force and displacement to a right angle.

Inside the head cylinder part 2215, a spring (for example, plate spring) 2216 corresponding to each contact point 2250 is provided, one end of the plate spring 2216 is fixed to the inner wall of the head cylinder part 2215, and the other end of the plate spring 2216 is fixed to the contact point 2250. Each plate spring 2216 biases the corresponding contact point 2250 in the direction of being moved into the head cylinder part 2215. When the rod 2230 is pulled upward by an external force, the force of each plate spring 2216 causes the contact point 2250 to follow the rod 2230 and to move in the direction of entering the head cylinder part 2215.

The part of the head cylinder part 2215 (the tip end part of the inside-diameter measuring device) where the contact point 2250 is protruded and retracted is also referred to as the measuring head part 2220.

The displacement detection part 2260 is provided inside the middle cylinder case part 2213 to detect displacement of the upper rod 2231. The displacement detection part 2260 is what is called a rotary encoder including a rotor 2261 provided to rotate integrally with the upper rod 2231, a stator 2262 that counts the revolutions of the rotor 2261, and a signal processing calculation unit (not shown). The detection method of the displacement detection part 2260 is not particularly limited, and examples of the displacement detection part 2260 include a photoelectric encoder, a capacitive encoder, an electromagnetic induction encoder, a magnetic encoder, and the like.

The outer case part 2270 is an outer cylinder part that covers the outside of the cylinder case part 2210. The outer case part 2270 is provided to cover the electric inside-diameter measuring device 2200 above the middle of the lower cylinder case part 2214. The outer case part 2270 is constituted by two parts of an outer case body part 2271 that accommodates the middle part thereinside and an outer case upper part 2272 that accommodates the upper part thereinside. The outer case body part 2271 is a cylindrical body that covers the entire middle cylinder case part 2213 corresponding to the middle part of the electric inside-diameter measuring device 2200, as well as the upper end side of the lower cylinder case part 2214 and the lower end side of the upper cylinder case part 2211.

The outer case upper part 2272 is a cylindrical body connected to the upper end of the outer case body part 2271 and covers the upper cylinder case part 2211 constituting the upper part of the electric inside-diameter measuring device 2200.

The display unit 2273 includes a display part 2274 and is attached to the side openings of the middle cylinder case part 2213 and the outer case body part 2271 to close the openings. The display part 2274 is the digital display part 2274 (for example, a liquid crystal display panel or an organic EL display panel) fitted into the central area of the display unit 2273. The display part 2274 shows the measurement value calculated by the signal processing calculation unit (not shown) and the like.

The display unit 2273 is provided with a connector, and the measurement value calculated by the signal processing calculation unit (not shown) is output externally.

The electric drive unit 2280 is a drive unit that rotates the ratchet sleeve 2242 of the thimble part 2240. The electric drive unit 2280 is attached above the outer case upper part 2272. The electric drive unit 2280 is, for example, a motor, and the rotational output of the motor is transmitted to the ratchet sleeve 2242 via a power transmission mechanism (a gear train, a coupling belt, a coupling shaft, a coupling link, or the like).

The operation of the electric inside-diameter measuring device 2200 is basically the same as that of an existing manual inside-diameter measuring device, except that the rod is fed by the electric drive unit 2280.

When the rod 2230 is moved forward and backward by electric power, the contact points 2250 are protruded from and retracted in the head cylinder part 2215 in accordance with the movement of the lower rod 2233. By detecting the displacement (position) of the rod 2230 when the three contact points 2250 are in even contact with the inner wall of a hole to be measured, the inside diameter of the hole to be measured is acquired as the measurement value.

(Measuring-device Support Frame Part 2300)

The measuring-device support frame part 2300 is an L-shaped member in side view and includes a support column part 2310 and a support base part 2320. The support base part 2320 is attached at right angles to the lower end of the vertical support column part 2310.

The support column part 2310 is adjacent and parallel to the electric inside-diameter measuring device 2200. The restriction means 2500 is provided on the front face of the support column part 2310, and the restriction means 2500 switches between holding and releasing of the electric inside-diameter measuring device 2200. This point is described later.

The support base part 2320 is provided so as to be bent in an L-shape from the lower end of the support column part 2310 toward the electric inside-diameter measuring device 2200. The support base part 2320 includes a first insertion hole 2321 through which the head cylinder part 2215 of the electric inside-diameter measuring device 2200 is inserted. The electric inside-diameter measuring device 2200 is attached in such a manner that the upper part above the lower cylinder case part 2214 is placed on the support base part 2320 via the floating joint part 2400 while the head cylinder part 2215 is inserted in the first insertion hole 2321.

(Floating Joint Part 2400)

The floating joint part 2400 is described below.

Figure 13:
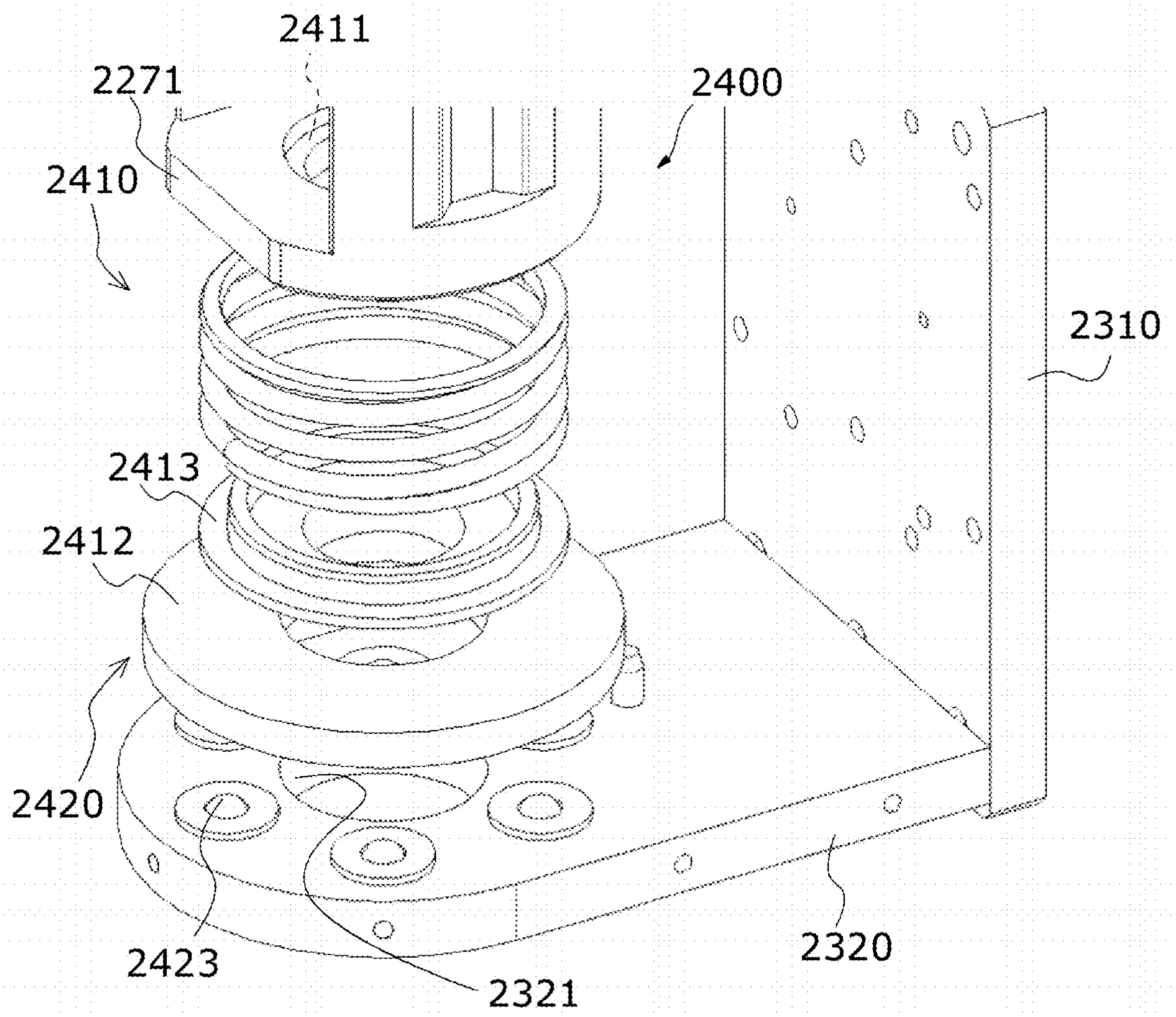
FIG. 13 is an exploded view of a floating joint part.

FIG. 13 is an exploded view of the floating joint part 2400.

Figure 14:
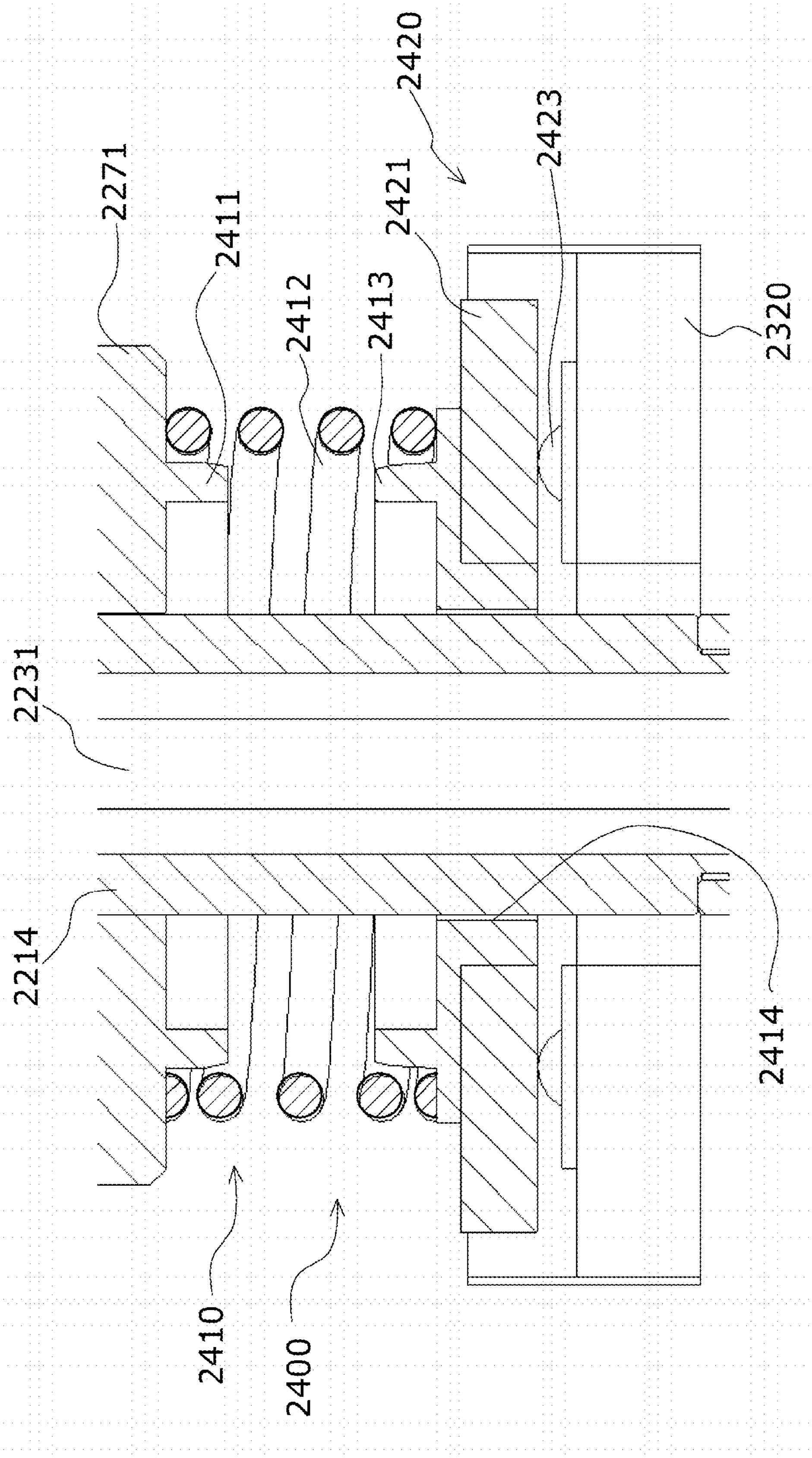
FIG. 14 is a cross-sectional view of the floating joint part.

FIG. 14 is a cross-sectional view of the floating joint part 2400.

The floating joint part 2400 is a joint (or coupling mechanism) that allows rotation of the electric inside-diameter measuring device 2200 with respect to the support frame part 2300 and also allows horizontal translation of the electric inside-diameter measuring device 2200 with respect to the support frame part 2300.

If there is an axial misalignment (inclination and distortion) between the electric inside-diameter measuring device 2200 and the hole to be measured, the floating joint part 2400 allowing rotation and translation allows the electric inside-diameter measuring device 2200 to autonomously adjust its own position and posture.

The floating joint part 2400 includes a rotation-allowing mechanism part 2410 and a translation-allowing mechanism part 2420.

The rotation-allowing mechanism part 2410 includes a first spring holder 2411, a coil spring (flexible body or elastic body) 2412, and a second spring holder 2413. The first spring holder 2411 and the second spring holder 2413 are roughly ring-shaped, with a flange extending radially outward from each ring.

As shown in the cross-sectional view in FIG. 14, the first spring holder 2411 is fitted externally to the outer surface of the lower cylinder case part 2214 at the upper side of the lower cylinder case part 2214, and the first spring holder 2411 is thereby fixedly attached to the electric inside-diameter measuring device 2200. Here, the lower end face of the outer case body part 2271 and the first spring holder 2411 are continuously integrated, and the position where the first spring holder 2411 is attached to the electric inside-diameter measuring device 2200 is fixedly regulated.

As an exemplary embodiment, the first spring holder 2411 may be installed in such a manner that the height (position) of the first spring holder 2411 corresponds to the height (position) of the center of gravity of the electric inside-diameter measuring device 2200. For example, the first spring holder 2411 is installed in such a manner that the height (position) of the first spring holder 2411 is approximately the same as the height (position) of the center of gravity of the electric inside-diameter measuring device 2200. Alternatively, the first spring holder 2411 may be installed in such a manner that the height (position) of the first spring holder 2411 is within 20%, 15%, 10%, or 5% (of the length of the electric inside-diameter measuring device 2200 in the vertical direction) above or below the height (position) of the center of gravity of the electric inside-diameter measuring device 2200.

The upper end of the coil spring 2412 is received by the first spring holder 2411 with the coil spring 2412 receiving the lower cylinder case part 2214 (electric inside-diameter measuring device 2200) thereinside. The lower end of the coil spring 2412 is received by the second spring holder 2413.

As an exemplary embodiment, instead of one coil spring 2412, a plurality of elastic bodies or springs may be provided to surround the electric inside-diameter measuring device 2200 (at equal angular intervals).

Although it is better for the spring to have a larger diameter (for the distance between the spring and the center axis of the electric inside-diameter measuring device 2200 to be larger) to support the electric inside-diameter measuring device 2200, if the diameter of the spring is too large (the distance between the spring and the center axis of the electric inside-diameter measuring device 2200 is too large), the measurement pressure of the inside-diameter measuring device alone cannot autonomously adjust the inclination of the electric inside-diameter measuring device 2200 to align with the axis of the hole. If the diameter of the spring is to be increased (the distance between the spring and the center axis of the electric inside-diameter measuring device 2200 is to be increased), the spring constant (modulus of elasticity) should be decreased.

If the diameter of the spring is to be reduced (the distance between the spring and the center axis of the electric inside-diameter measuring device 2200 is to be reduced), the spring constant (modulus of elasticity) may be slightly increased. Although the elastic spring is described in the exemplary embodiment, the member coupling the first spring holder 2411 and the second spring holder 2413 may be a flexible member without elasticity instead of the coil spring 2412, as long as the posture adjustment in the rotational direction of the electric inside-diameter measuring device 2200 can be allowed.

The second spring holder 2413 is coupled to the translation-allowing mechanism part 2420. As shown in the cross-sectional view in FIG. 14, a ring hole 2414 of the second spring holder 2413 has a slight length (height) in the axial direction, and the diameter of the ring hole 2414 is slightly larger than the cylinder case part 2210 (lower cylinder case part 2214) of the electric inside-diameter measuring device 2200 to the extent that it allows the inclination of the electric inside-diameter measuring device 2200. The ring hole 2414 may be a tapered hole in which the diameter of the ring hole increases toward the upper side or lower side.

The translation-allowing mechanism part 2420 includes a horizontal plate (translation body) 2421 and a ball roller 2423.

The horizontal plate 2421 is a plate provided above the support base part 2320. The horizontal plate 2421 includes a second insertion hole 2422 through which the electric inside-diameter measuring device 2200 (lower cylinder case part 2214) is inserted. The second spring holder 2413 is fitted into the second insertion hole 2422 from above.

That is, the rotation-allowing mechanism part 2410 is on the horizontal plate 2421, and the electric inside-diameter measuring device 2200 is supported by the rotation-allowing mechanism part 2410. In other words, the electric inside-diameter measuring device 2200 is supported on the horizontal plate 2421 with the rotation-allowing mechanism part 2410 therebetween.

The ball roller 2423 is disposed on the upper face of the support base part 2320. Here, four ball rollers 2423 are installed at 90-degree intervals around the first insertion hole 2321 and the second insertion hole 2422, and the horizontal plate 2421 is placed on the ball rollers 2423.

The horizontal plate 2421 placed on the ball rollers 2423 can move horizontally with very little force, almost without friction. On the other hand, in order to deform the coil spring 2412 (elastic body) as the rotation-allowing mechanism part 2410, a force is required to resist the elastic force. Therefore, in the present exemplary embodiment, when a force (rotational or translational force) acts on the electric inside-diameter measuring device 2200, the translation-allowing mechanism part 2420 has relative priority in displacement.

Figure 15:
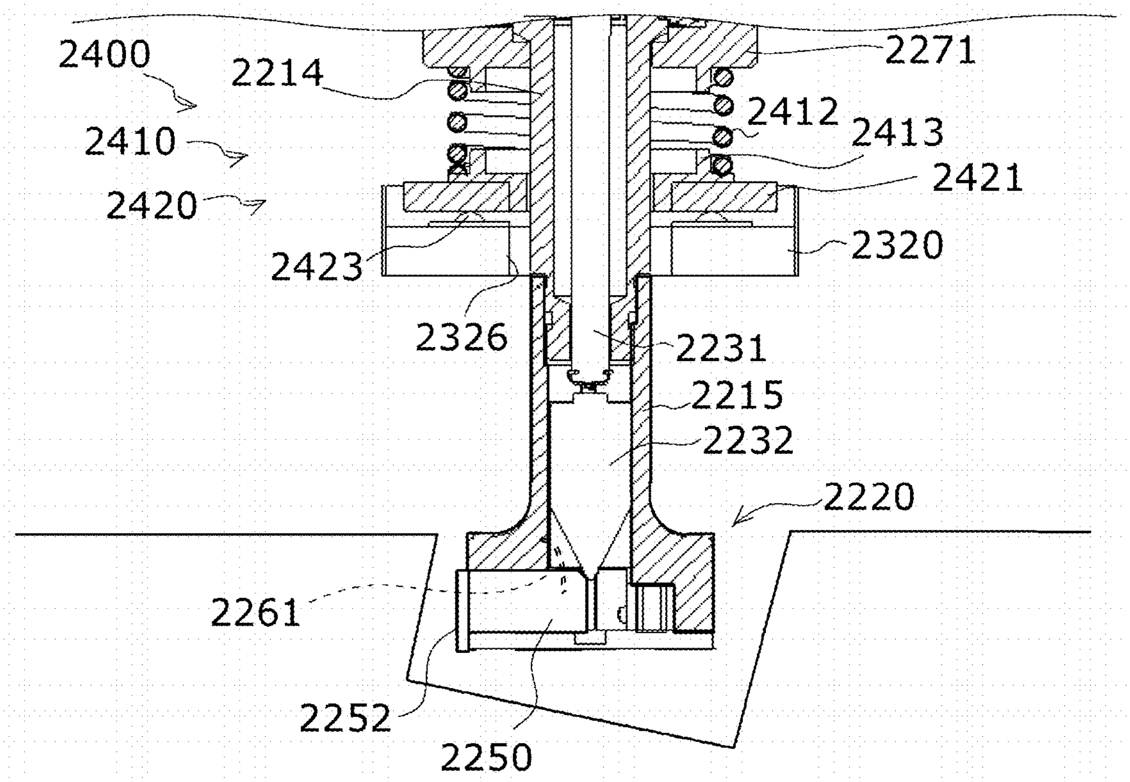
FIG. 15 is a diagram for explaining a function for adjusting a position and posture of the electric inside-diameter measuring device.

The operation of adjusting the position and posture of the electric inside-diameter measuring device 2200 by the effects of the floating joint part 2400 is described with reference to FIGS. 15 to 19. For example, FIG. 15 shows a case assuming that a hole to be measured has been machined with a deviation from the design value and that the hole that should have been drilled vertically has an inclination and slightly deviates from the position of the design value to the right in the drawing. The electric inside-diameter measuring unit 2120 is moved to the hole by the robot arm part 2130, and the measuring head part 2220 is inserted into the hole. Even if the drive of the robot arm part 2130 is accurately controlled, there is a position and angle deviation between the axis of the electric inside-diameter measuring device 2200 and the axis of the hole to be measured, because the hole to be measured deviates from the design value.

Figure 16:
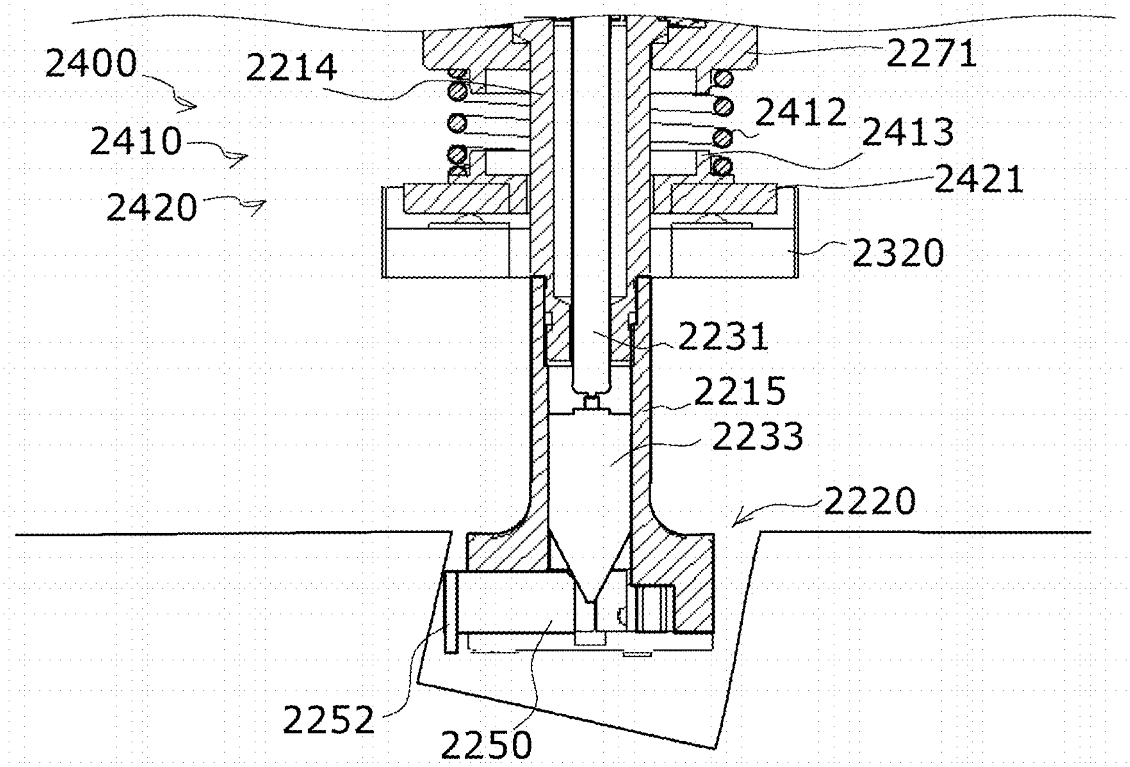
FIG. 16 is a diagram for explaining a function for adjusting a position and posture of the electric inside-diameter measuring device.
Figure 17:
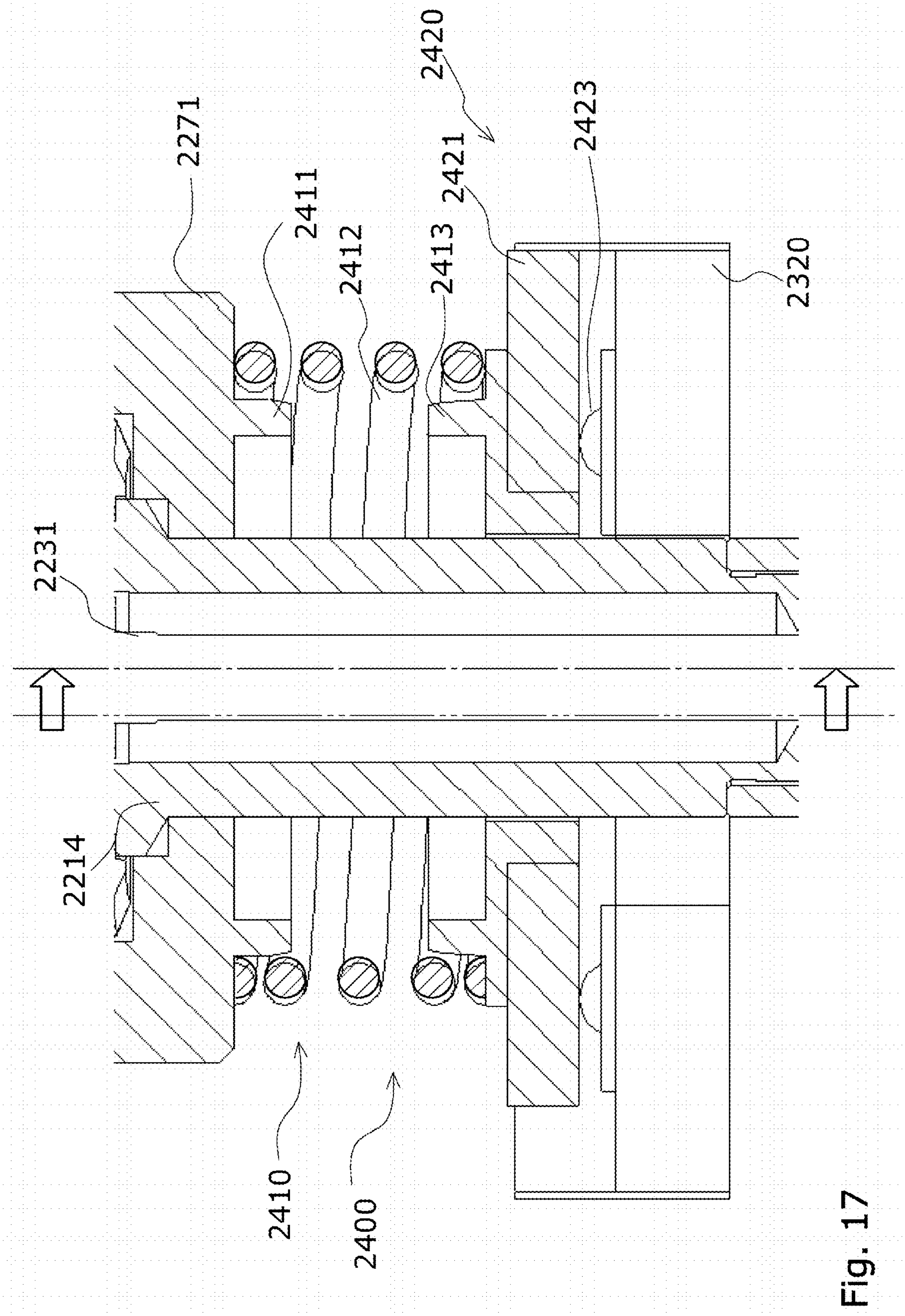
FIG. 17 is a diagram for explaining a function for adjusting a position and posture of the electric inside-diameter measuring device.

Now, in order to accurately measure the inside diameter of the hole to be measured, all the three contact points 2250 need to be brought into even contact with the inside wall of the hole to be measured. First, the electric drive unit 2280 drives the rod 2230 to move the rod 2230 downward. Then, the tip (cone) of the lower rod 2233 protrudes the contact points 2250, and one of the three contact points 2250 closer to the inner wall of the hole to be measured is brought into contact with the inner wall of the hole to be measured. As the lower rod 2233 continues to protrude the contact points 2250, a reaction force is applied to the contact points 2250 from the inside wall of the hole. This reaction force causes the electric inside-diameter measuring device 2200 to be pushed in the opposite direction. The reaction force pushes near the lower end of the lower rod 2233 from the contact points 2250, but the displacement of the horizontal plate 2421 occurs first before the deformation of the coil spring 2412 of the rotation-allowing mechanism part 2410. Thus, as shown in FIGS. 16 and 17, the displacement of the horizontal plate 2421 first absorbs the axial misalignment between the electric inside-diameter measuring device 2200 and the hole to be measured. The first insertion hole 2321 of the support base part 2320 has a diameter large enough to allow horizontal movement of the electric inside-diameter measuring device 2200.

Figure 18:
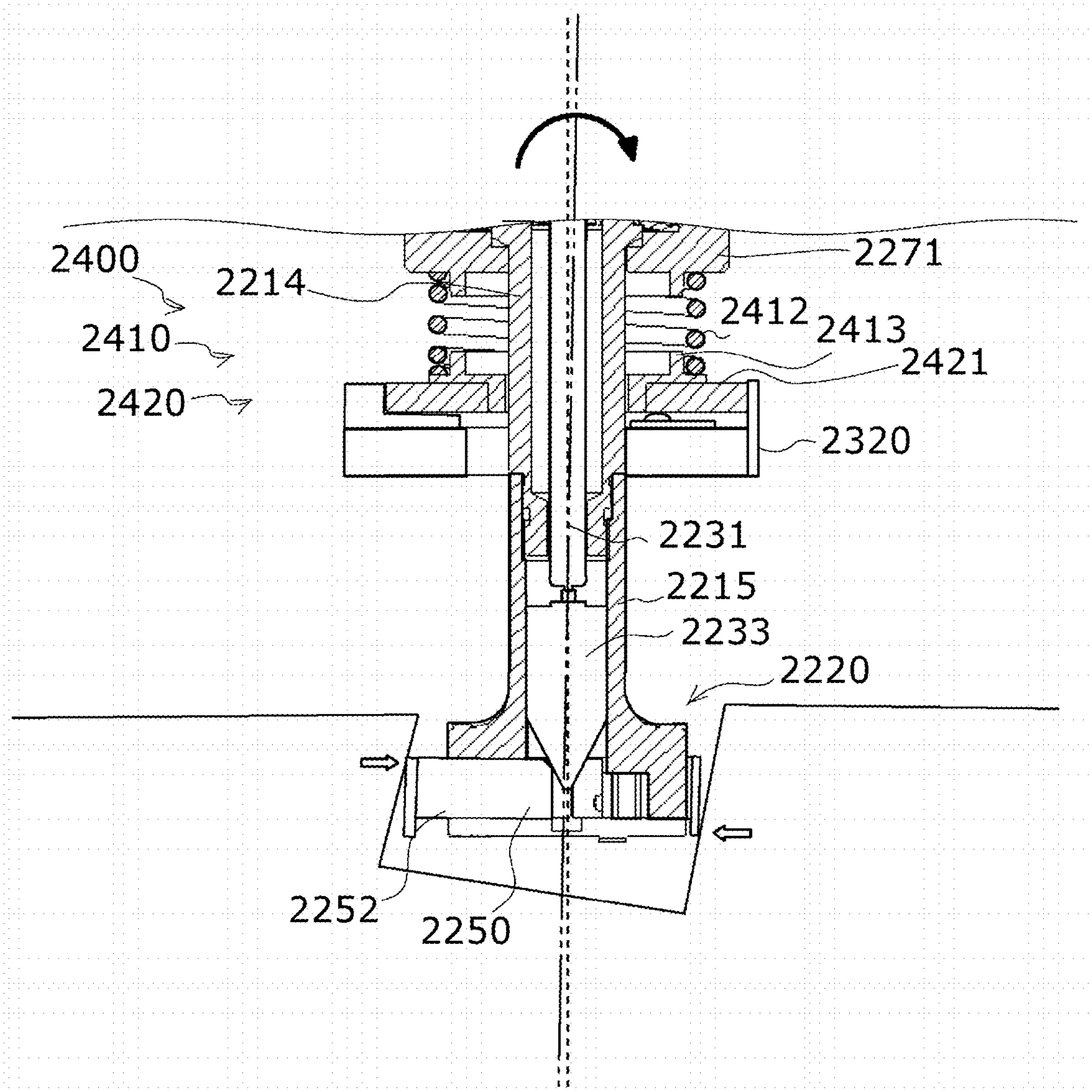
FIG. 18 is a diagram for explaining a function for adjusting a position and posture of the electric inside-diameter measuring device.
Figure 19:
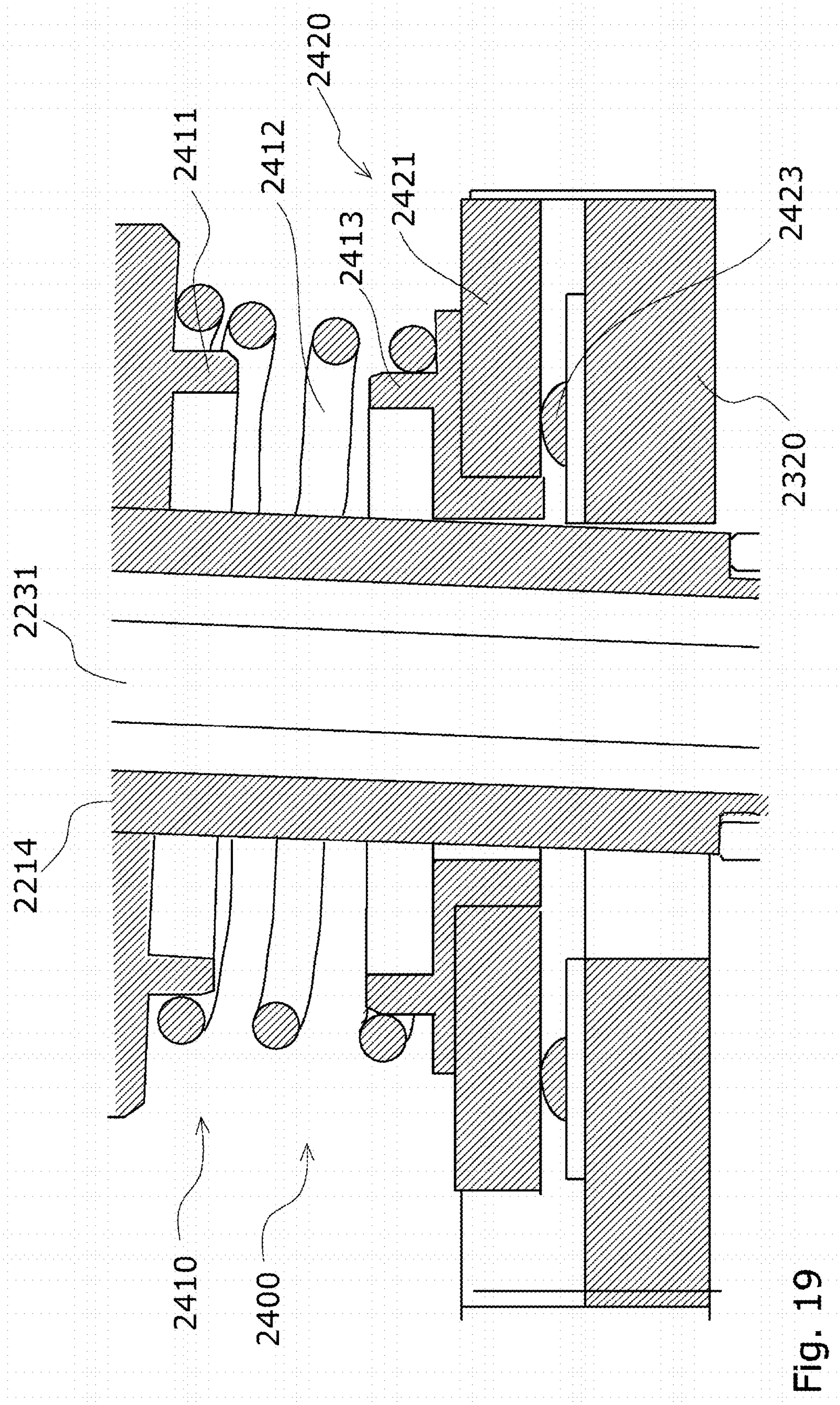
FIG. 19 is a diagram for explaining a function for adjusting a position and posture of the electric inside-diameter measuring device.

At the time of FIG. 16 (FIG. 17), the axal inclination is still misaligned between the electric inside-diameter measuring device 2200 and the hole to be measured. When the lower rod 2233 continues to protrude the contact points 2250 from the state shown in FIG. 16 (FIG. 17), the tips (round shafts) of the contact points 2250 are brought into contact with the inner wall of the hole, and at this time (due to the length of the three round shafts), the reaction force applied to the electric inside-diameter measuring device 2200 from the inner wall of the hole to be measured has a moment of rotation. At this time, the reaction force from the inner wall of the hole deforms the coil spring 2412 of the rotation-allowing mechanism part 2410 as shown in FIGS. 18 and 19, and the inclination of the electric inside-diameter measuring device 2200 is adjusted to align the axis of the electric inside-diameter measuring device 2200 with the axis of the hole to be measured. The ring hole 2414 of the second spring holder 2413 allows the inclination of the electric inside-diameter measuring device 2200.

Eventually, when the three contact points 2250 push against the inner wall of the hole to be measured with the predetermined measurement pressure, the floating joint part 2400 (the rotation-allowing mechanism part 2410 and the translation-allowing mechanism part 2420) allows the electric inside-diameter measuring device 2200 to autonomously adjust its own position and posture to accurately measure the inside diameter of the hole to be measured. In other words, once the robot arm part 2130 is able to insert the measuring head part 2220 of the electric inside-diameter measuring device 2200 into the hole to be measured, the inside diameter of the hole can be accurately measured through automatic posture adjustment without the need for manual sensory adjustment or advanced feedback control.

(Restriction Means 2500)

The restriction means 2500 is provided to the support frame part 2300 to hold and support the electric inside-diameter measuring device 2200. The restriction means 2500 includes two clamping pieces 2510 that clamp the electric inside-diameter measuring device 2200 from a direction perpendicular to the axis as shown, for example, in FIGS. 9 and 10. Here, the clamping pieces 2510 clamp the outer case body part 2271 from both sides. The clamping pieces 2510 are movable, and the restriction means 2500 can switch between a hold state of the electric inside-diameter measuring device 2200 and a release state in which the holding is released.

Even though the clamping pieces 2510 are opened to release the electric inside-diameter measuring device 2200, the gap between each clamping piece 2510 and the electric inside-diameter measuring device 2200 is preferably limited to a predetermined upper limit (about 5 mm or 10 mm) to regulate any large displacement (translation or inclination) of the electric inside-diameter measuring device 2200 beyond the limit.

The electric inside-diameter measuring device 2200 is placed on the support base part 2320 via the floating joint part 2400. In order for the electric inside-diameter measuring device 2200 to be able to autonomously adjust its posture according to the hole to be measured with its own measurement pressure, the floating joint part 2400 needs to be soft (softness or flexibility). Therefore, if the electric inside-diameter measuring device 2200 is simply placed on the floating joint part 2400, the electric inside-diameter measuring device 2200 can swing unsteadily, be inclined greatly, or fall down, depending on the rigidity (softness) of the floating joint part 2400. From a safety point of view, it is undesirable that the electric inside-diameter measuring device 2200 swings or falls down. In addition, if the posture of the electric inside-diameter measuring device 2200 is not fixed, the position of the measuring head part 2220 is unstable, and the robot arm part 2130 cannot be able to insert the measuring head part 2220 of the electric inside-diameter measuring device 2200 into the hole to be measured.

For these reasons, when the electric inside-diameter measuring device 2200 is not inserted in a hole to be measured, the restriction means 2500 clamps and holds the electric inside-diameter measuring device 2200. Then, when the measuring head part 2220 of the electric inside-diameter measuring device 2200 is inserted in a hole to be measured, the restriction means 2500 releases the electric inside-diameter measuring device 2200 in order for the electric inside-diameter measuring device 2200 to be able to autonomously change and adjust its posture (to perform autonomous adjustment) by the floating joint part 2400.

(Collision Detection Part 2600)

The collision detection part 2600 detects that the electric inside-diameter measuring device 2200 has collided with something with a force greater than a predetermined force.

Figure 20:
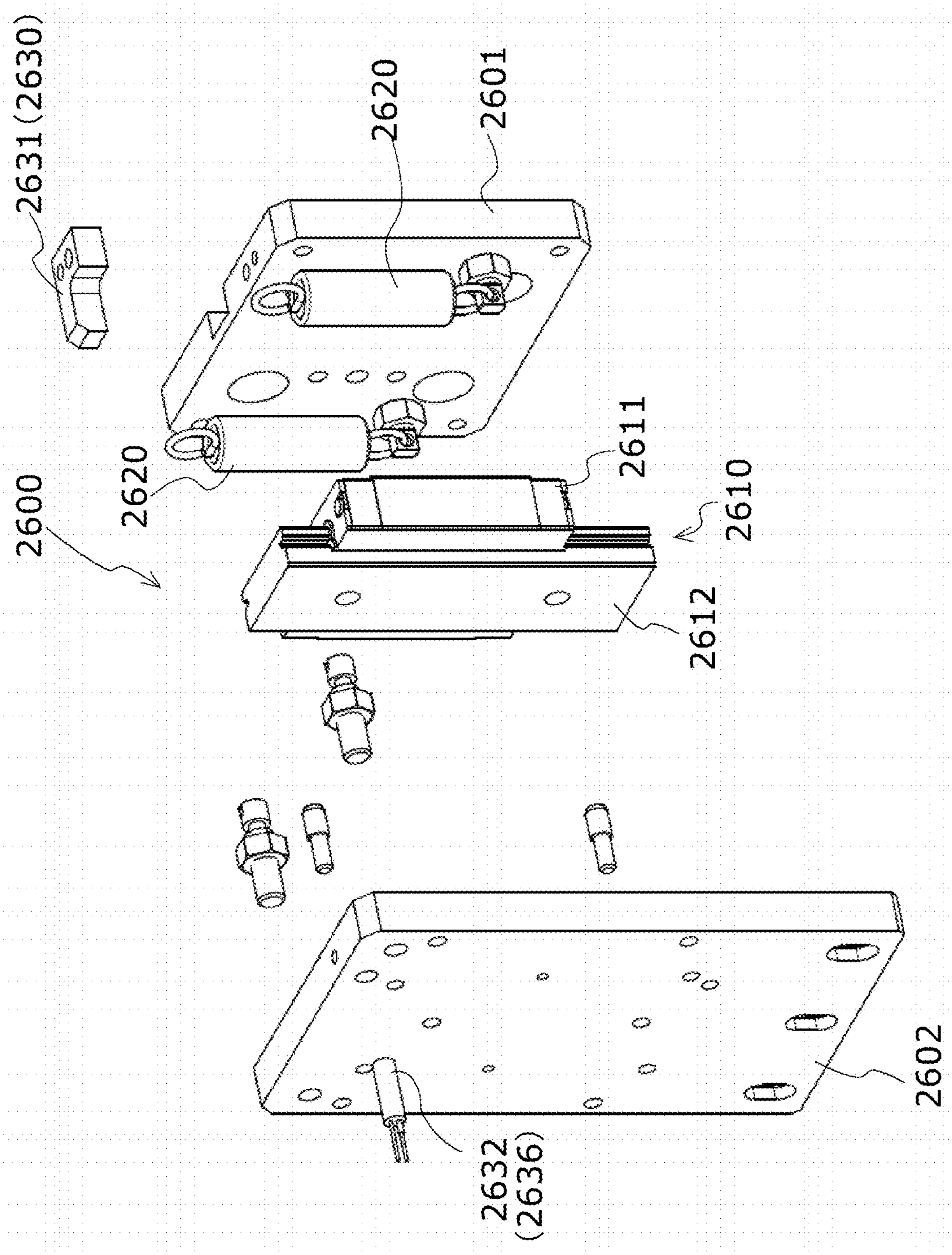
FIG. 20 is an exploded view of a collision detection part.

FIG. 20 is an exploded view of the collision detection part 2600.

Figure 21:
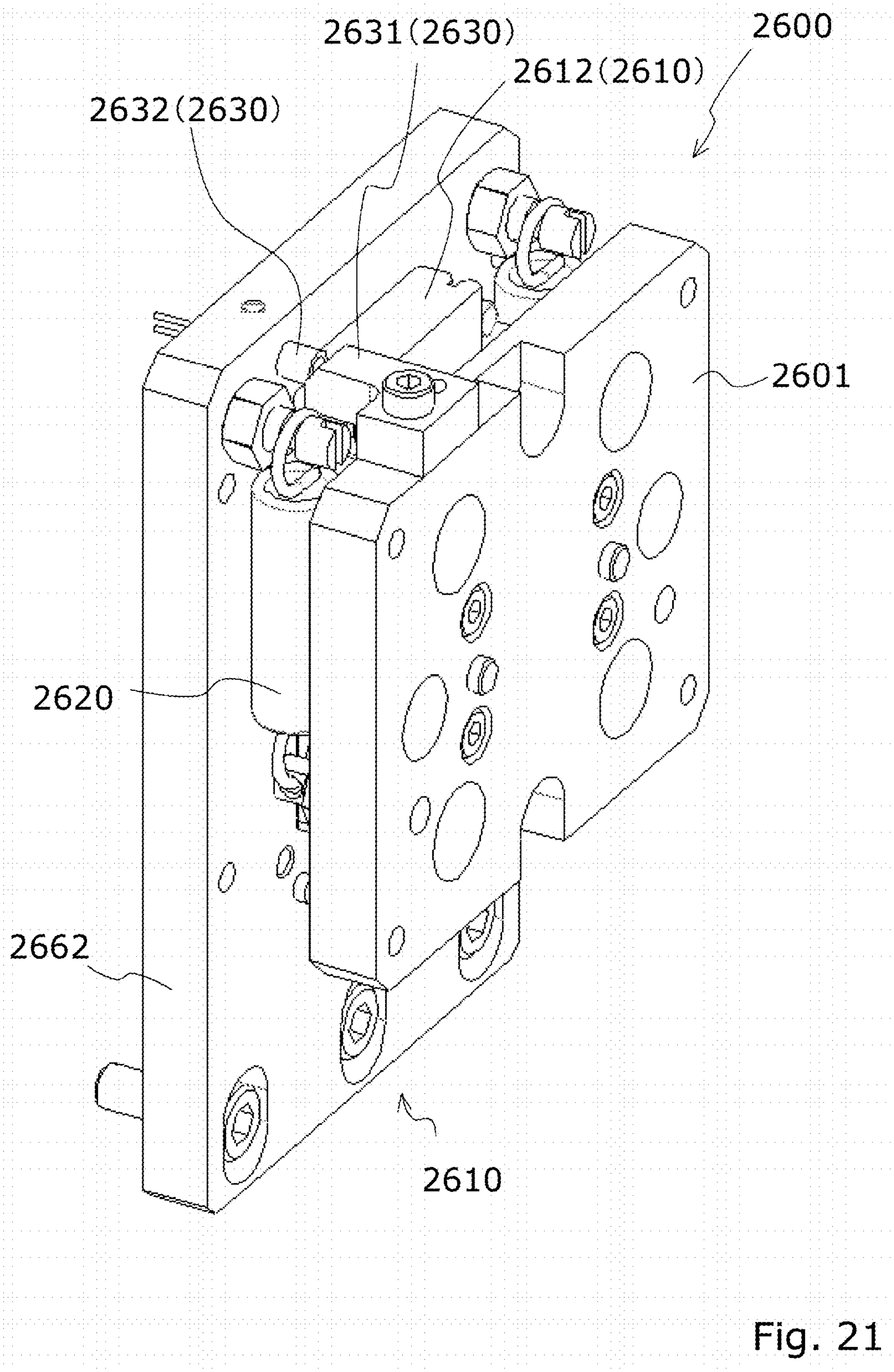
FIG. 21 is a perspective view of the collision detection part when viewed from a slightly rear side.

FIG. 21 is a perspective view of the collision detection part 2600 when viewed from a slightly rear side.

The collision detection part 2600 is provided between the rear side of the support column part 2310 and the hand part 2131 of the robot arm part 2130. Here, the collision detection part 2600 detects that a large force is applied to the electric inside-diameter measuring device 2200 in the direction of being pushed upward from below in the Z direction (vertical direction) when the electric inside-diameter measuring device 2200 approaches an object (for example, the workpiece W) from above the object and collides with the workpiece W. That is, the collision detection direction of the collision detection part 2600 is almost parallel to the direction when the electric inside-diameter measuring device 2200 approaches a hole to be measured.

The collision detection part 2600 includes a fixed plate 2601, a mounting plate 2602, a linear guide 2610, a biasing means 2620, and a contact sensor 2630.

The fixed plate 2601 is attached directly or indirectly to the hand part 2131 of the robot and is fixedly provided to the hand part 2131. Here, the force sensor part 2132 is provided between the hand part 2131 of the robot and the collision detection part 2600. Therefore, the collision detection part 2600 is attached to the hand part 2131 of the robot arm part 2130 via the force sensor part 2132.

The mounting plate 2602 is attached directly or indirectly to the rear face of the support column part 2310 and is fixedly provided to the support column part 2310 (support frame part 2300). The linear guide 2610 is disposed between the fixed plate 2601 and the mounting plate 2602 and guides the moving direction of the mounting plate 2602 with respect to the fixed plate 2601 in the vertical direction. The linear guide 2610 includes a groove frame body 2611 having a groove in the vertical direction and a slide body 2612 that slides in the groove of the groove frame body 2611 in the vertical direction. Here, the groove frame body 2611 is attached to the fixed plate 2601, and the slide body 2612 is attached to the mounting plate 2602.

The biasing means 620 is two coil springs 2620.

One end of each coil spring 2620 is fastened to the fixed plate 2601, and the other end of the coil spring 2620 is fastened to the mounting plate 2602. Each coil spring 2620 constantly biases the mounting plate 2602 in the direction of pulling down the mounting plate 2602 with respect to the fixed plate 2601. That is, the position of the mounting plate 2602 when the mounting plate 2602 is lowered vertically downward with respect to the fixed plate 2601 by its own weight, the weight of the electric inside-diameter measuring device 2200, and the biasing force of the coil spring 2620 is a reference position.

The contact sensor 2630 includes a contact detection block 2631 disposed on the fixed plate 2601, and a ball plunger 2632 provided to the mounting plate 2602. As shown in FIG. 21, when the mounting plate 2602 is at the reference position with respect to the fixed plate 2601, the ball plunger 2632 on the mounting plate 2602 is in contact with (fitting into) the contact detection block 2631.

Here, it is assumed that, for example, the position of a hole machined in a workpiece W deviates significantly from the design value. In this state, when the robot arm part 2130 attempts to insert the electric inside-diameter measuring device 2200 into the hole to be measured from above, the measuring head part 2220 of the electric inside-diameter measuring device 2200 collides with the workpiece W. The electric inside-diameter measuring device 2200 (measuring head part 2220) deviates from the hole and collides with the workpiece W, and the electric inside-diameter measuring device 2200 (measuring head part 2220) is pushed further into the workpiece W. Then, when a force exceeding the gravitational force of the electric inside-diameter measuring device 2200 and the biasing force of the biasing means (coil springs) 2620 are applied to the collision detection part 2600, the mounting plate 2602 slides upward and the ball plunger 2632 of the mounting plate 2602 is removed from the contact detection block 2631. The contact sensor 2630 transmits a signal (collision detection signal) when the contact detection block 2631 detects the separation of the ball plunger 2632 (or when the contact detection block 2631 can no longer detect the contact of the ball plunger 2632).

When the collision detection part 2600 detects that the electric inside-diameter measuring device 2200 has collided with something, the control unit 2140 immediately stops the operation of the robot arm part 2130.

(Force Sensor Part 2132)

The force sensor part 2132 is, for example, a 6-axis (forces in three orthogonal axial directions and rotational forces around the axes) force sensor. While the collision detection part 2600 is specialized to detect a force pushing up from below in the vertical direction (Z-direction), the force sensor part 2132 detects forces applied to the electric inside-diameter measuring device 2200 in all directions.

The articulated robot arm part 2130 is what is called a robot arm and moves the hand part 2131, which is the tip of the robot arm part 2130, three-dimensionally with the vertical and horizontal rotational drive axes. The hand part 2131 of the robot arm part 2130 is coupled to the support frame part 2300 via the force sensor part 2132 and the collision detection part 2600. The force sensor part 2132 detects that the electric inside-diameter measuring device 2200 has collided with an object with an unexpected force exceeding a predetermined force in directions where the collision detection part 2600 does not detect collisions (that is, in directions other than the vertical direction (Z direction)). When the force sensor part 2132 detects an unexpected collision of the electric inside-diameter measuring device 2200, the control unit 2140 immediately stops the operation of the robot arm part 2130. This further ensures safety.

(Vibration Motor 2700)

The vibration motor (vibration actuator) 2700 is attached to the electric inside-diameter measuring device 2200. A mounting support 2710 is attached to the housing of the electric drive unit 2280, and the vibration motor 2700 is installed above the electric drive unit 2280 by the mounting support 2710. Here, the vibration motor 2700 is installed on the center axis of the electric inside-diameter measuring device 2200 and on the side away from the contact points 2250. The vibration motor 2700 is installed on the central axis because it is convenient for balancing the overall weight, but the vibration motor 2700 may be installed off the central axis. In this case, it is preferable to attach a counterbalance so that the center of gravity of the inside-diameter measuring device does not deviate from the central axis line.

Here, the vibration motor 2700 is installed on the side away from the contact points 2250 because it is advantageous in terms of moment and it is considered that even a small vibration motor 2700 can provide sufficiently effective vibration to the contact points 2250. The vibration motor 2700 may be installed as close to the contact point 2250 as possible. In this case, the vibration of the vibration motor 2700 is directly transmitted to the contact points 2250. This is suitable, for example, when the vibration of the contact point 2250 needs to be finely controlled according to the material of the workpiece W.

(Control Unit 2140)

Figure 22:
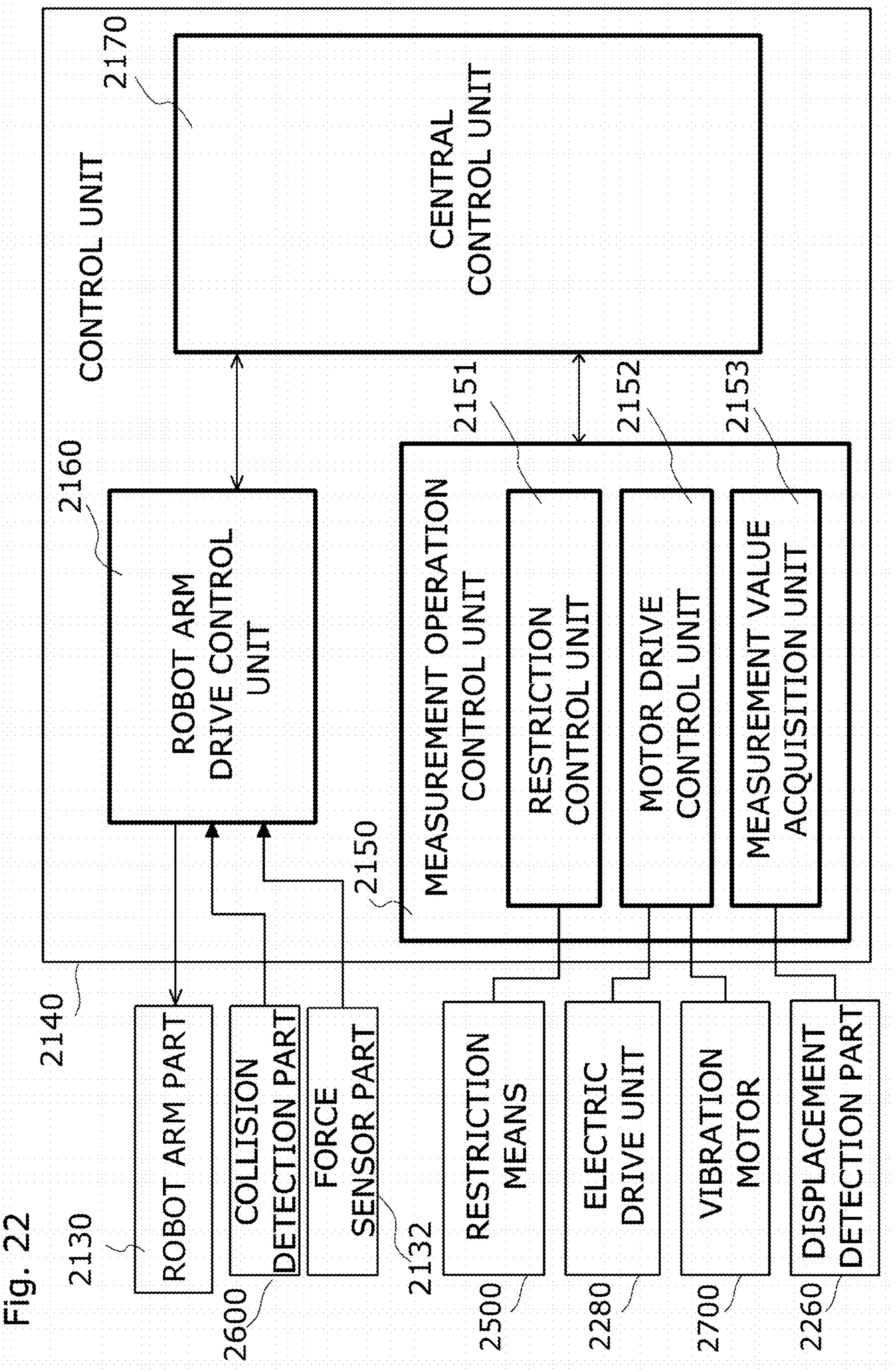
FIG. 22 is a functional block diagram showing a control unit.

FIG. 22 is a functional block diagram showing the control unit 2140. The control unit 2140 includes a measurement operation control unit 2150, a robot arm drive control unit 2160, and a central control unit 2170.

The measurement operation control unit 2150 controls the measurement operation of the electric inside-diameter measuring device 2200.

The measurement operation control unit 2150 includes a restriction control unit 2151, a motor drive control unit 2152, and a measurement value acquisition unit 2153.

The restriction control unit 2151 controls the opening and closing operation of the clamping pieces 2510 of the restriction means 2500 to control the timing of holding and releasing the electric inside-diameter measuring device 2200. The motor drive control unit 2152 controls the drive of the electric drive unit 2280 and the vibration motor 2700. The measurement value acquisition unit 2153 acquires a measurement value from the electric inside-diameter measuring device 2200. That is, the measurement value acquisition unit 2153 receives a sensor value of the displacement detection part 2260 to acquire the measurement value of the inside diameter of a hole to be measured based on the displacement (position) of the rod 2230.

The robot arm drive control unit 2160 controls the operation of the robot arm part 2130. The central control unit 2170 integrally controls the measurement operation control unit 2150 and the robot arm drive control unit 2160.

(Control Operation of Automatic Inside-diameter Measuring Apparatus 2100)

The following describes a series of operations in which the measuring-apparatus main body 2110 (the electric inside-diameter measuring unit 2120 and the robot arm part 2130) automatically measures the inside diameter of a hole to be measured under the control of the control unit 2140.

Figure 23:
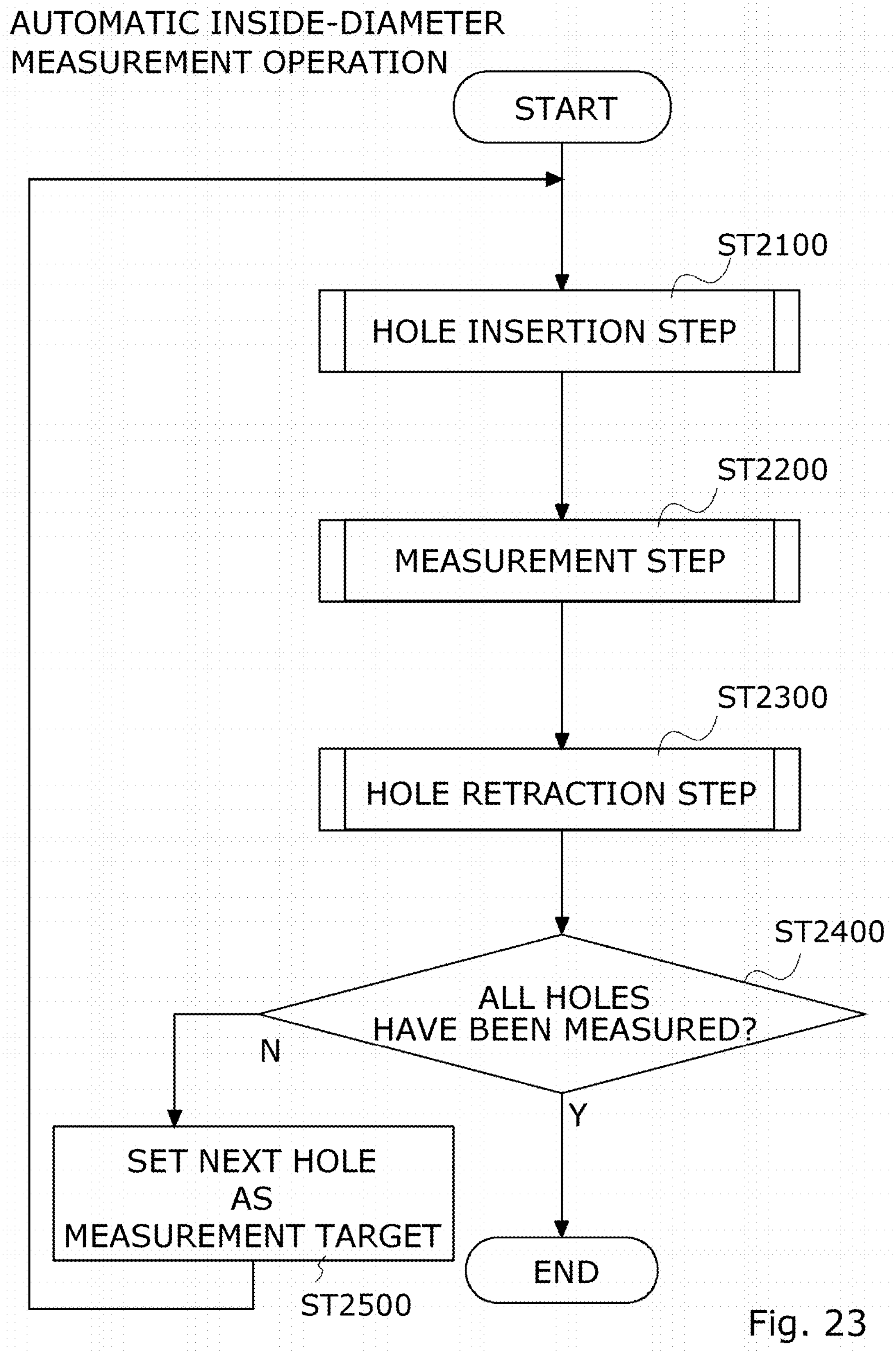
FIG. 23 is a flowchart showing an overall operation in an automatic inside-diameter measurement.

FIG. 23 is a flowchart of the overall operation of automatic inside-diameter measurement (automatic inside-diameter measurement operation).

The workpiece W (object to be measured) having a hole (hole to be measured) is transferred by a conveyor belt or rail in a production line and brought to a predetermined position in front of the measuring-apparatus main body 2110 (the electric inside-diameter measuring unit 2120 and the robot arm part 2130). The automatic inside-diameter measuring apparatus 2100 automatically and sequentially performs inside-diameter measurement on the inside diameters of holes that are designated (set) as objects to be measured among the workpieces W (objects to be measured) to be transferred. The position (coordinates) of a hole to be measured of each designated workpiece W (objects to be measured) has been set (stored) as part of a measuring part program in the central control unit 2170. Alternatively, the inside-diameter measurement may be performed automatically and sequentially while searching for a hole to be measured by image recognition using the camera 150 or the like.

Here, it is assumed that the hole to be measured is a hole drilled to have an opening on the top face in the vertical direction, and that the electric inside-diameter measuring device 2200 is inserted into the hole from above while maintaining a roughly vertical orientation.

The automatic inside-diameter measurement operation has a hole insertion step (approaching step) (ST2100), a measurement step (ST2200), and a hole retraction step (retraction step) (ST2300).

The hole insertion step (ST2100) is a step of moving the electric inside-diameter measuring unit 2120 by the robot arm part 2130 and inserting the measuring head part 2220 of the electric inside-diameter measuring device 2200 into the hole to be measured (in other words, a step of approaching the workpiece W from above the workpiece W).

Figure 24:
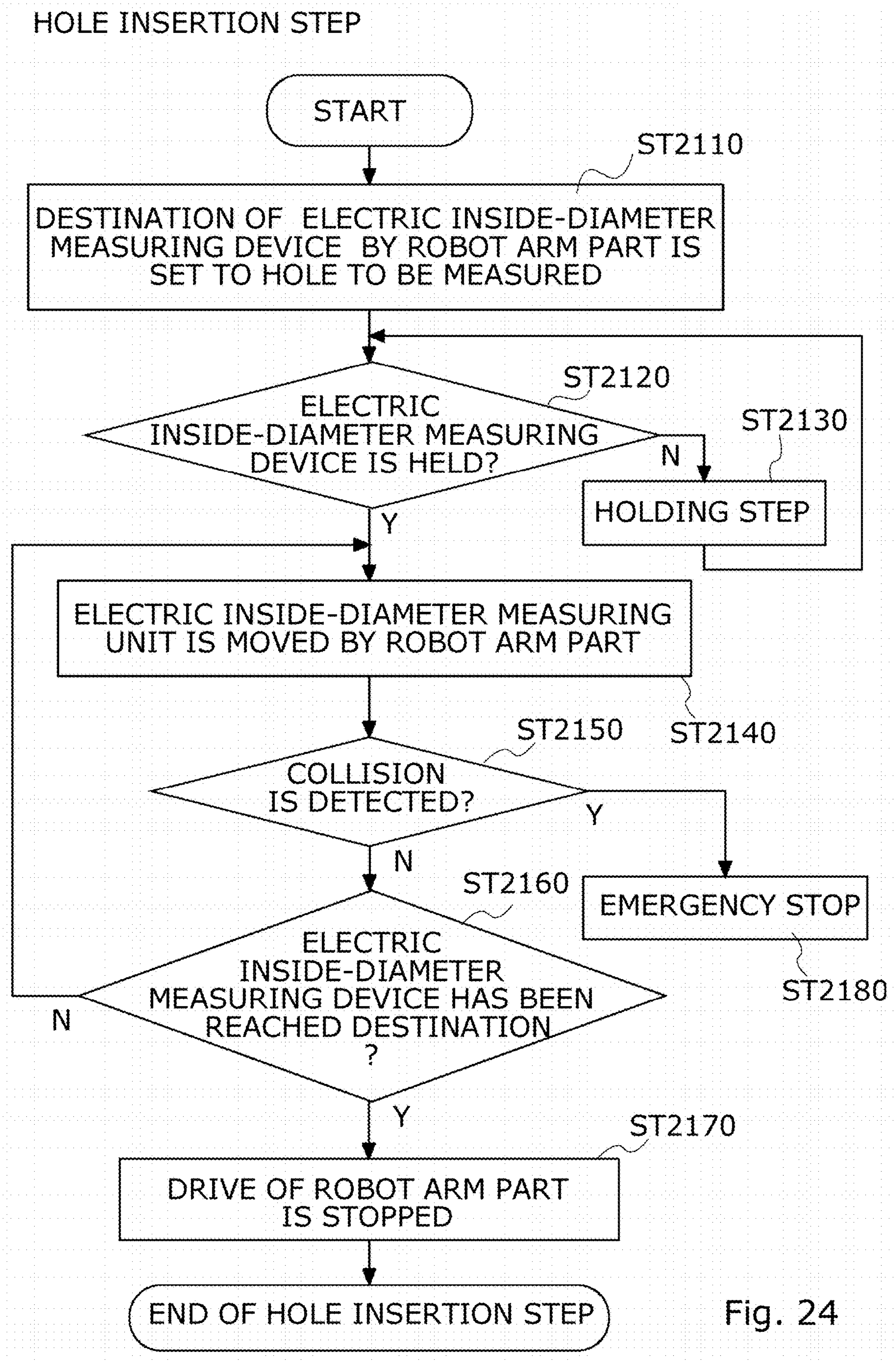
FIG. 24 is a flowchart showing an operational procedure of a hole insertion step.

FIG. 24 is a flowchart showing an operating procedure of the hole insertion step (ST2100).

In the hole insertion step (ST2100), first, the destination (target coordinates) of the electric inside-diameter measuring device 2200 to be moved by the robot arm part 2130 is set to the hole to be measured (ST2110). Then, it is confirmed that the electric inside-diameter measuring device 2200 is restricted by the restriction means 2500 (ST2120). In the present exemplary embodiment, the state in which the restriction means 2500 restricts (holds) the electric inside-diameter measuring device 2200 is a default state (which may be paraphrased as a standard state or a reference state). However, since the holding by the restriction means 2500 can be released after the electric inside-diameter measuring device 2200 is maintained or replaced, the hold state needs to be confirmed. Then, when the electric inside-diameter measuring device 2200 is not held (ST2120: NO), the restriction control unit 2151 transmits a signal to perform a holding step (ST2130) by the restriction means 2500. By restricting (holding) the electric inside-diameter measuring device 2200 while the robot arm part 2130 moves the electric inside-diameter measuring unit 2120, the robot arm part 2130 can stably and safely move the electric inside-diameter measuring device 2200.

The drive of the robot arm part 2130 is started (ST2140) to move the electric inside-diameter measuring unit 2120, and the measuring head part 2220 of the electric inside-diameter measuring device 2200 is inserted into the hole to be measured.

At this time, for example, if the machining position of the hole to be measured has deviated from the design value, the electric inside-diameter measuring device 2200 (measuring head part 2220) can unexpectedly collide with the workpiece W. In this regard, the robot arm drive control unit 2160 monitors signals from the collision detection part 2600 and the force sensor part 2132 (ST2150). If a collision between the electric inside-diameter measuring device 2200 (measuring head part 2200) and the workpiece W is detected (ST2150: YES), the drive of the robot arm part 2130 is immediately stopped (emergency stop) (ST2180). Thereafter, the central control unit 2170 may report the abnormality to an operator.

When the measuring head part 2220 of the electric inside-diameter measuring device 2200 is inserted into the hole to be measured and reaches the target coordinates, the drive of the robot arm part 2130 is temporarily stopped (ST2170).

Next, the procedure proceeds to the measurement step (ST2200).

Figure 25:
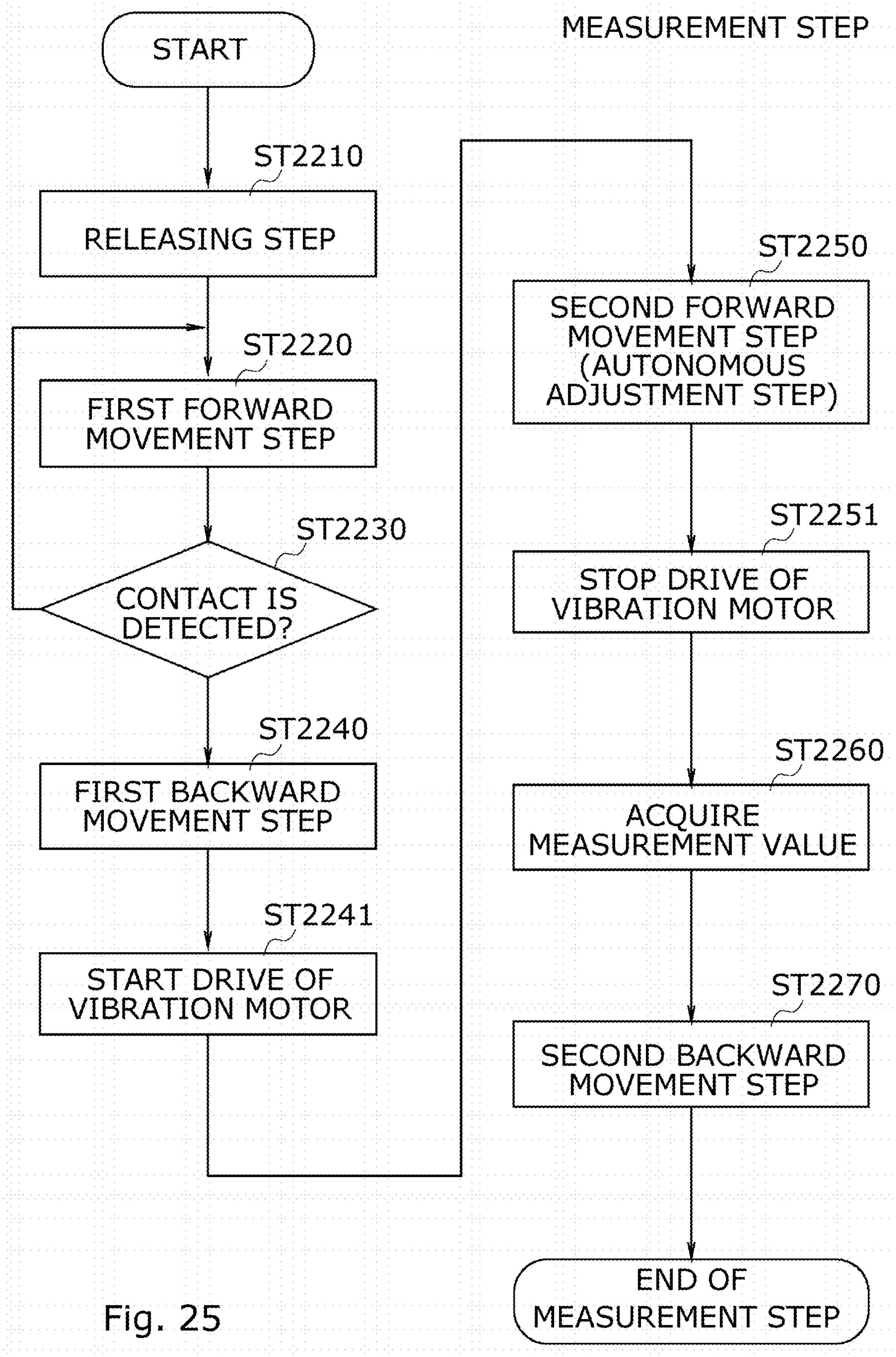
FIG. 25 is a flowchart showing an operational procedure of a measurement step.

FIG. 25 is a flowchart showing an operating procedure of the measurement step (ST2200). In the measurement step (ST2200), first, the holding by the restriction means 2500 is released (ST2210) to put the electric inside-diameter measuring device 2200 in a release state. Thus, the electric inside-diameter measuring device 2200 is in a state of being supported by the support frame part 2300 via the floating joint part 2400, which allows the electric inside-diameter measuring device 2200 to autonomously adjust its position and posture.

Then, the motor drive control unit 2152 transmits a drive signal to drive the electric drive unit 2280. First, a first forward movement step (ST2220) is performed. The first forward movement step (ST2220) is a step of moving the contact points 2250 forward until the contact points 2250 are brought into first contact with the inner wall of the hole to be measured. The electric drive unit 2280 (for example, a motor) is driven to move the rod 2230 forward (in this case, downward) to move the contact points 2250 forward toward the inner wall of the hole. In the first forward movement step (ST2220), the motor is driven at high speed to move the rod 2230 and the contact points 2250 as fast as possible to improve measurement efficiency. (For example, if the rod 2230 is a screw feed, the rotational speed of the rod 2230 is 100 rpm to 200 rpm. In terms of the speed at which the rod 2230 or the contact points 2250 move, the speed may be 10 μm/s to 20 μm/s.)

As the contact points 2250 move forward toward the inner wall of the hole, the contact points 2250 are brought into contact with the inner wall of the hole.

Here, in the present exemplary embodiment, the number of contact points 2250 is three. If the axis of the electric inside-diameter measuring device 2200 and the axis of the hole to be measured are perfectly aligned, the three contact points 2250 can be brought into contact with the inner wall of the hole at the same time, but the axis of the electric inside-diameter measuring device 2200 and the axis of the hole to be measured are misaligned because of the driving error of the robot arm part 2130 and the machining error of the workpiece W. In this case, any one of the three contact points 2250 is brought into first contact with the inner wall of the hole. When any one of the three contact points 2250 has been brought into contact with the inner wall of the hole (ST2230: YES), the first forward movement step (ST2220) is immediately stopped, and the procedure proceeds to a first backward movement step (ST2240). The fact that the contact points 2250 have been brought into contact with the inner wall of the hole may be confirmed, for example, by calculating the motor torque from the applied current (applied voltage) of the motor to determine that (one of) the contact points (has) have been brought into contact with the inner wall of the hole when the torque exceeds a predetermined value.

In the first backward movement step (ST2240), the rod 2230 and the contact points 2250 are moved backward slightly in the opposite direction. This avoids the contact points 2250 from digging into the inner wall of the hole due to its momentum after the contact points 2250 have been brought into contact with the inner wall of the hole in the first forward movement step (ST2220). The distance for moving the contact points 2250 backward in the first backward movement step (ST2240) is very small, for example, 0.001 mm to 0.01 mm.

The speed of backward movement of the contact points 2250 in the first backward movement step (ST2240) may be as fast as possible. For example, if the rod 2230 is a screw feed, the rotational speed of the rod 2230 is 100 rpm to 200 rpm. In terms of the speed at which the rod 2230 or the contact points 2250 move, the speed may be 10 μm/s to 20 μm/s.

After the contact points 2250 are moved backward slightly in the first backward movement step (ST2240), the motor drive control unit 2152 start the drive of the vibration motor 2700 (ST2241). In other words, after the first backward-movement step (ST2240) and before the start of a second forward-movement step (ST2250), the motor drive control unit 2152 starts the drive of the vibration motor 2700 (ST2241).

In the second forward movement step (ST2250), the contact points 2250 are moved forward again. In the second forward movement step (ST2250), the contact points 2250 are moved forward slowly (at a low speed with fine movement).

The feed speed of the contact points 2250 in the second forward movement step (ST2250) is preferably slow (fine movement). For example, if the rod 2230 is a screw feed, the rotational speed of the rod 2230 is 10 rpm to 20 rpm. In terms of the speed at which the rod 2230 or the contact points 2250 move, the speed may be 1 μm/s to 2 μm/s.

The position and inclination of the electric inside-diameter measuring device 2200 are autonomously adjusted by the reaction force of the contact points 2250 pushing against the inner wall of the hole. The effects of the autonomous adjustment of the position and inclination of the electric inside-diameter measuring device 2200 by the floating joint part 2400 allowing translation and rotation are as described above. In addition, the vibration of the vibration motor 2700 is transmitted to the contact points 2250 (round shaft tips 2252) at this time to cause the contact points 2250 (round shaft tips 2252) to vibrate slightly. This reduces the friction at the interface between the contact points 2250 (round shaft tips 2252) and the workpiece W (inner wall of the hole), and facilitates a change in the posture of the electric inside-diameter measuring device 2200.

When the three contact points 2250 are in even contact with the inner wall of the hole with the predetermined measurement pressure, the autonomous adjustment of the position and inclination of the electric inside-diameter measuring device 2200 is completed. When the three contact points 2250 are in contact with the inner wall of the hole with the predetermined measurement pressure, the ratchet mechanism (constant pressure mechanism) is activated. That is, the electric drive unit 2280 rotates and drives the thimble part 2240 (ratchet sleeve 2242) until the ratchet mechanism (constant pressure mechanism) is activated, which causes the contact points 2250 to be in even contact with the inner wall of the hole with the predetermined measurement pressure.

The second forward movement step (ST2250) can be rephrased as an autonomous adjustment step.

At this point, the motor drive control unit 2152 stops the drive of the vibration motor 2700 (ST2251).

In this state, the displacement detection part 2260 detects the displacement (position) of the rod 2230. In acquiring the measurement value, the displacement (position) of the rod 2230 may be detected by the displacement detection part 2260 immediately after the drive of the vibration motor 2700 is stopped, or by performing the measurement-pressure application step again to driving the electric drive unit 2280 at a relatively high speed and activate the ratchet mechanism (constant pressure mechanism), the measurement value may be sampled when the constant pressure is applied. The measurement value acquisition unit 2153 acquires the inside diameter of the hole based on the displacement (position) of the rod 2230 (ST260).

After the measurement value is acquired, the contact points 2250 are moved backward in a second backward movement step (ST2270) to separate the contact points 2250 from the inner wall of the hole.

Figure 26:
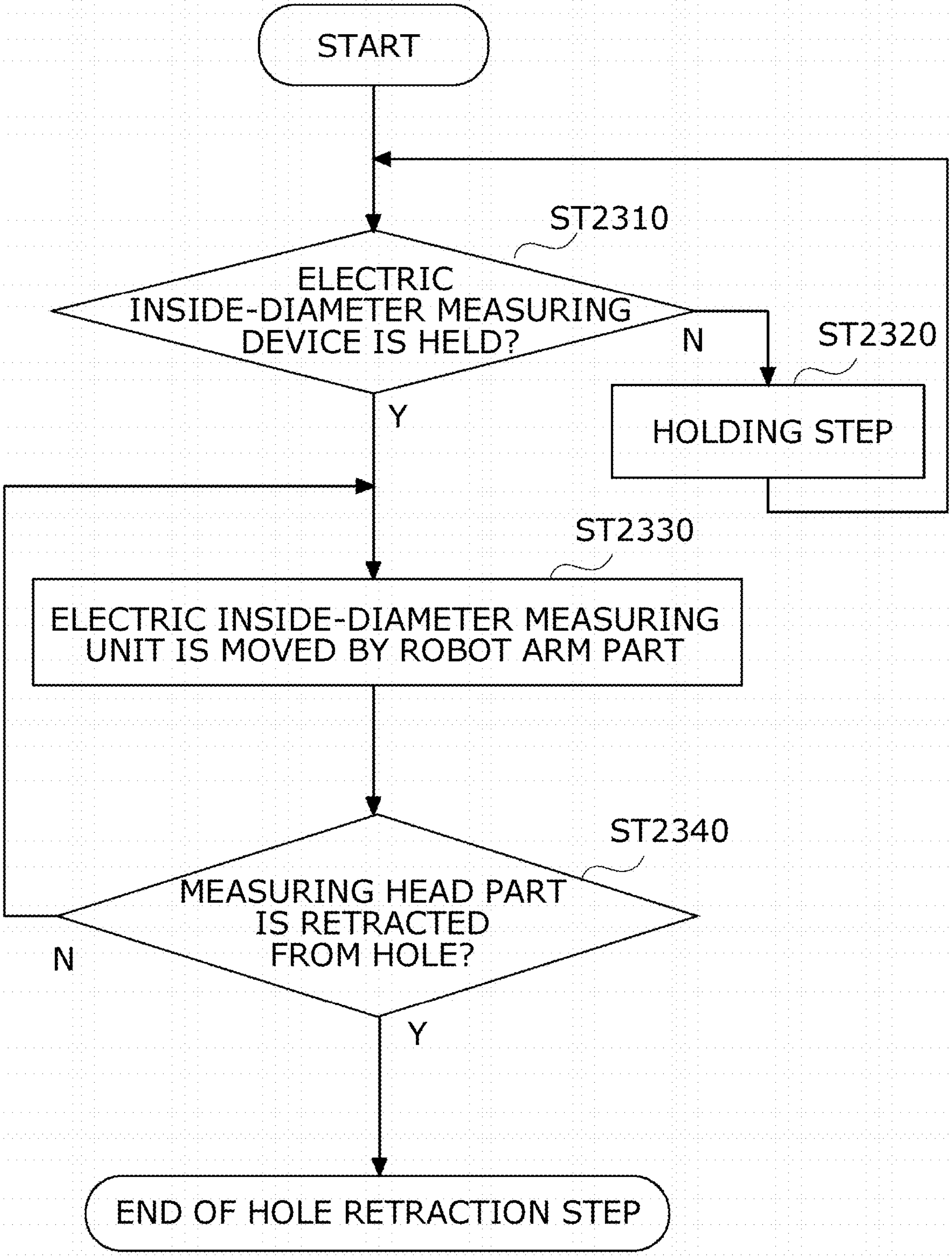
FIG. 26 is a flowchart showing an operating procedure of a hole retraction step.

After the measurement step (ST2200), the electric inside-diameter measuring device 2200 is retracted from the hole to be measured in the hole retraction step (ST2300). FIG. 26 is a flowchart showing an operation procedure of the hole retraction step (ST2300). In the hole retraction step (ST2300), first, the electric inside-diameter measuring device 2200 is restricted (held) by the restriction means 2500 (ST2320), and then the robot arm part 2130 moves the electric inside-diameter measuring unit 2120 to be retracted from the hole (ST2330).

This completes the measurement of the inside diameter of one hole. Until measurement of all the holes to be measured is completed, ST2100 to ST2300 are repeated (ST2400).

In this manner, according to the present exemplary embodiment, the inside diameter of a hole can be automatically measured by the electric inside-diameter measuring unit 2120 (the electric inside-diameter measuring device 2200 and the robot arm part 2130) without the need for a person to hold and operate the inside-diameter measuring device. In the case of inside diameter measurement, the three contact points 2250 need to be properly in close contact with the inner wall of the hole. However, due to the weight of the inside-diameter measuring device and the surface texture (roughness) of the workpiece W, the posture of the inside-diameter measuring device cannot be changed properly by the contact points 2250 (round shaft tip 2252) sliding on the inner wall of the hole. In this respect, the vibration motor 2700 is driven at an appropriate timing in the present exemplary embodiment to reduce the friction between the contact point 2250 (round shaft tip 2252) and the workpiece W (inner wall of the hole) and facilitate a change in the posture of the inside-diameter measuring device. This makes it possible to acquire stable measurement values even in automatic measurement.

In the above embodiment, the releasing step (ST2210) is performed before the first forward movement step (ST2220). The releasing step (ST2210) may be suspended until the contact between the contact point 2250 and the inner wall of the hole is detected (ST2230: Yes), and after the contact between the contact point 2250 and the inner wall of the hole is detected in the first forward movement step (ST2220), the releasing step (ST2210) may be performed before the first backward movement step (ST2240). Alternatively, the releasing step (ST2210) may be performed after the contact between the contact point 2250 and the inner wall of the hole is detected (ST2230: Yes) and the first backward movement step (ST2240) is performed. However, the start of the drive of the vibration motor 2700 is performed after the releasing step and before the second forward movement step (ST2250).

Third Exemplary Embodiment

A third exemplary embodiment of the present invention is described below.

In the second exemplary embodiment, the floating joint part 2400, the restriction means 2500, and the vibration motor 2700 are provided in the electric inside-diameter measuring unit 2120. In the third exemplary embodiment, a floating joint part 3400, a restriction means 3500, and a vibration motor 3700 are provided in a workpiece holding part.

Figure 27:
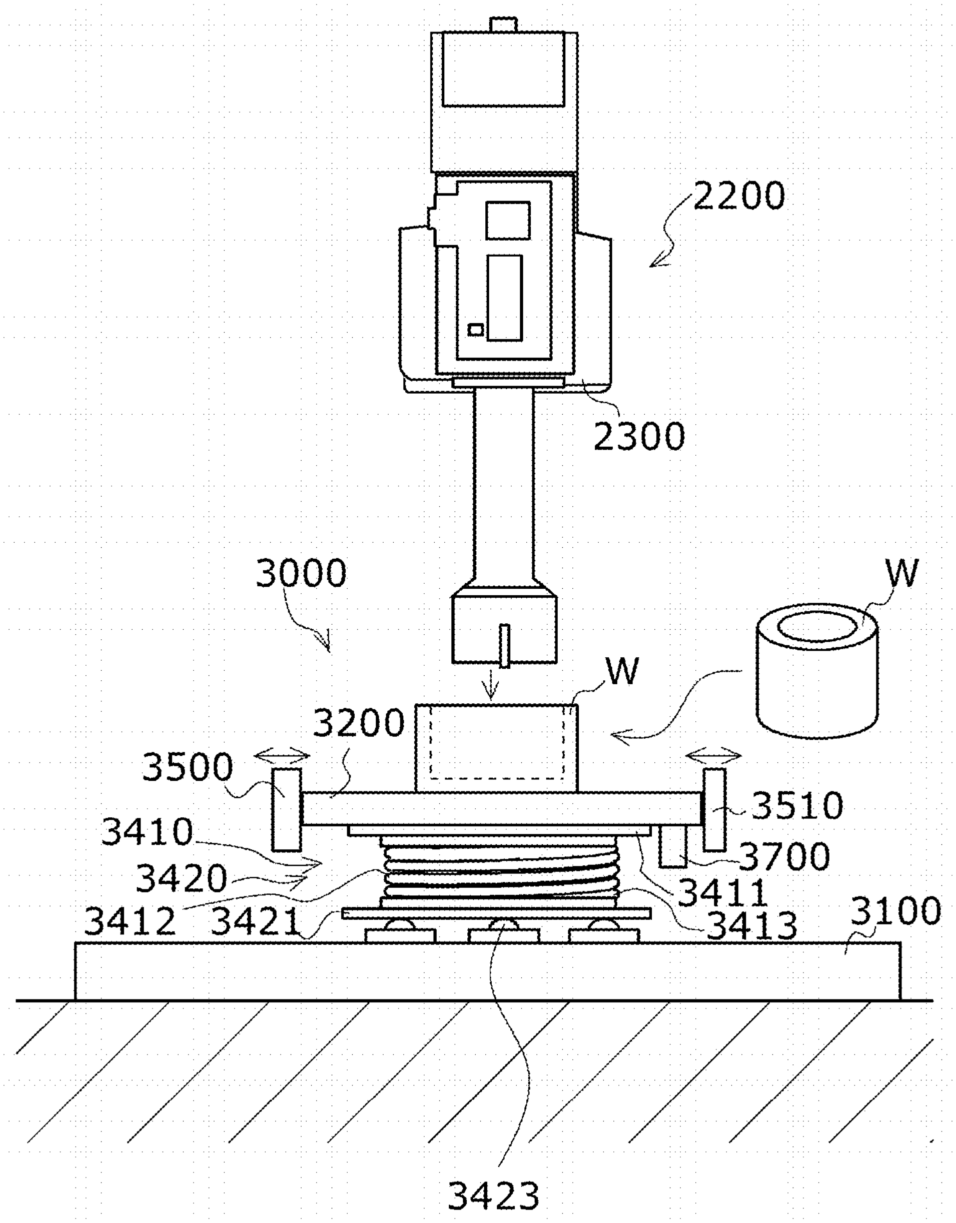
FIG. 27 is a diagram schematically showing a workpiece holding base part according to a third exemplary embodiment.

FIG. 27 is a diagram schematically showing the third exemplary embodiment.

In the third exemplary embodiment, the electric inside-diameter measuring device 2200 is directly attached to the measuring-device support frame part 2300. The hand part 2131 of the robot arm part 2130 is coupled to the support frame part 2300 via the force sensor part 2132 and the collision detection part 2600, which may be common to the second exemplary embodiment. Therefore, it is not assumed that the hand part 2131 of the robot arm part 2130 and the electric inside-diameter measuring device 2200 change their relative position or relative posture.

In the third exemplary embodiment, a workpiece holding base part (workpiece holding part) 3000 is provided.

The workpiece holding base part 3000 includes a base part 3100, a workpiece installation stage 3200, a floating joint part 3400, a restriction means 3500, and a vibration motor 3700.

The workpiece W is placed on the workpiece installation stage 3200. It is assumed that the workpiece W is transferred by a moving means (robot) for transferring workpieces, but a person may replace the workpiece W by hand. Here, it is assumed that the workpiece W does not slide and move on the surface of the workpiece installation stage 3200. For example, if the surface of the workpiece installation stage 3200 has a non-slip finish and the workpiece W has some weight, the workpiece W does not easily move on the workpiece installation stage 3200. Alternatively, the surface of the workpiece installation stage 3200 may have a recessed portion (recess) to receive the workpiece W, or a plurality of pins (protrusions) to restrict the movement of the workpiece W.

The configuration of the floating joint part 3400 is basically the same as that in the second exemplary embodiment. That is, the floating joint part 3400 including a translation-allowing mechanism part 3420 that allows translation of the workpiece installation stage 3200 with respect to the base part 3100 and a rotation-allowing mechanism part 3410 that allows rotation of the workpiece installation stage 3200 with respect to the base part 3100. Between the base part 3100 and the workpiece installation stage 3200, the translation-allowing mechanism part 3420 and the rotation-allowing mechanism part 3410 are provided in this order from a lower side.

A first spring holder 3411 is provided on the rear face of the workpiece installation stage 3200, a second spring holder 3413 is provided on the upper face of a horizontal plate (translation body) 3421, and a coil spring 3412 is interposed between the first spring holder 3411 and the second spring holder 3413. A ball roller 3423 is disposed on the upper face of the base part 3100, and the horizontal plate (translator) 3421 is provided on the ball roller 3423. The floating joint part 3400 is interposed between the base part 3100 and the workpiece installation stage 3200 to allow translational movement of the workpiece installation stage 3200 and rotational displacement of the workpiece installation stage 3200. In other words, the workpiece holding base part 3000 can allow translation and rotation of the workpiece W placed on the workpiece installation stage 3200.

The restriction means 3500 restricts the displacement of the workpiece installation stage 3200 and clamps the workpiece installation stage 3200 from both sides by two clamping pieces 3510 having a configuration almost similar to that of the restriction means 2500 in the second exemplary embodiment. By closing or opening the movable clamping pieces 3510, the restriction means 3500 can switch between a hold state of the workpiece installation stage 3200 and a release state in which the holding is released.

The vibration motor 3700 is installed on the workpiece installation stage 3200. The vibration motor 3700 is preferably provided, but may not be provided. Since the workpiece holding base part (workpiece holding part) 3000 in the third exemplary embodiment allows displacement of the workpiece installation stage 3200 by the floating joint part 3400, the workpiece W can be pushed and displaced by the contact points of the measuring device without the vibration motor 3700. However, if the workpiece W is a heavy object, the vibration motor 3700 is desirably provided to cause the workpiece W to be displaced.

Figure 28:
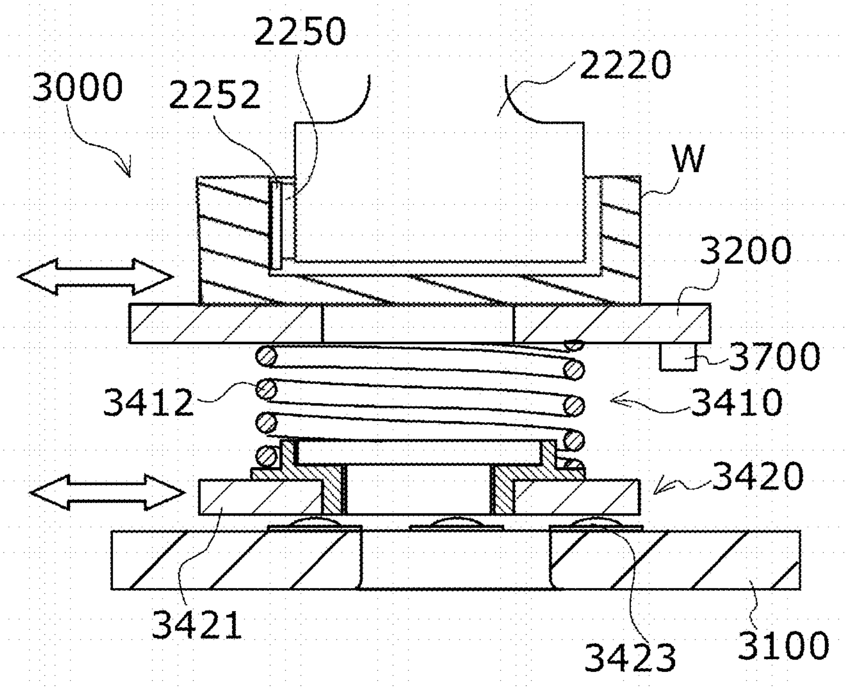
FIG. 28 is a diagram showing an example of a function of the workpiece holding base part for adjusting a posture of a workpiece.
Figure 29:
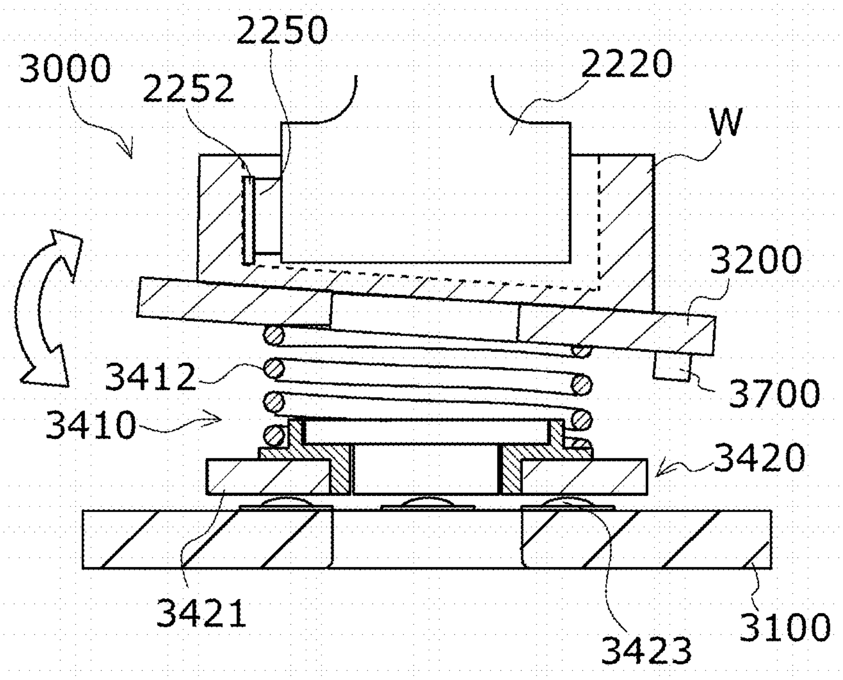
FIG. 29 is a diagram showing an example of a function of the workpiece holding base part for adjusting a posture of the workpiece.

The third exemplary embodiment is different from the second exemplary embodiment in that an object to be held/released by the restriction means 3500 is the workpiece installation stage 3200 and that an object to be vibrated by the vibration motor 3700 is the workpiece W via the workpiece installation stage 3200. The steps of automatic inside-diameter measurement operation are similar to those in the second exemplary embodiment. As the effects of the workpiece holding base part 3000 in the third exemplary embodiment, the workpiece installation stage 3200 is translated and inclined (rotated) in such a manner that the inner wall of the workpiece W and the contact points 2250 (round shaft tips 2252) of the electric inside-diameter measuring device 2200 are in close contact. For example, as shown in FIG. 28, if the centerline of the workpiece deviates from the center of the hole, the workpiece installation stage 3200 is translated to adjust the position of the workpiece in such a manner that all the contact points 2250 (round shaft tips 2252) are in close contact with the inner wall of the workpiece. Alternatively, as shown in FIG. 29, if the centerline of the workpiece is inclined with respect to the bottom of the workpiece, the workpiece installation stage 3200 is inclined (rotated) to adjust the position of the workpiece in such a manner that all the contact points 2250 (round shaft tips 2252) are in close contact with the inner wall of the workpiece. In addition, by applying vibration to the workpiece W from the vibration motor 3700 through the workpiece installation stage 3200, the friction at the interface between the contact points 2250 (round shaft tips 2252) and the workpiece W (inner wall of the hole) can be reduced to facilitate a change in the posture of the workpiece W on the workpiece installation stage 3200.

In the third exemplary embodiment, the electric inside-diameter measuring device 2200 is not supported by the floating joint part 3400, and the posture of the electric inside-diameter measuring device 2200 can be controlled almost as intended by the hand (hand part 2131) of the robot (moving means) to maintain a vertical posture, for example. The electric inside-diameter measuring device 2200 is to be connected to a power feed cable and a transmission cable for control signals or measurement data, and this applies forces due to the rigidity and the weight of the cables to the electric inside-diameter measuring device 2200. As in the second exemplary embodiment, if the electric inside-diameter measuring device 2200 is supported by a displacement-allowing mechanism such as the floating joint part 3400, the posture may be affected by external disturbances. In this regard, the electric inside-diameter measuring device 2200 is not supported by the floating joint part 3400 in the third exemplary embodiment, and is not easily affected by external disturbances such as cables. Although the workpiece installation stage 3200 supporting the workpiece W is supported by the floating joint part 3400, there is no need to connect a thick cable to the workpiece installation stage 3200, which eliminates the workpiece installation stage 3200 being affected by cables or other disturbances. This enables stable dimensional measurement of the workpiece.

In the above embodiment, the base part 3100 and the workpiece installation stage 3200 are connected by the floating joint part 3400, and the floating joint part 3400 includes the rotation-allowing mechanism part 3410 and the translation-allowing mechanism part 3420. Since the workpiece installation stage 3200 is only required to be translated and rotated (inclined) to some extent with respect to the base part 3100, the floating joint part 3400 may be, for example, elastic rubber, foam resin, a spring, or an air-sealed bag such as an air cap.

Figure 30:
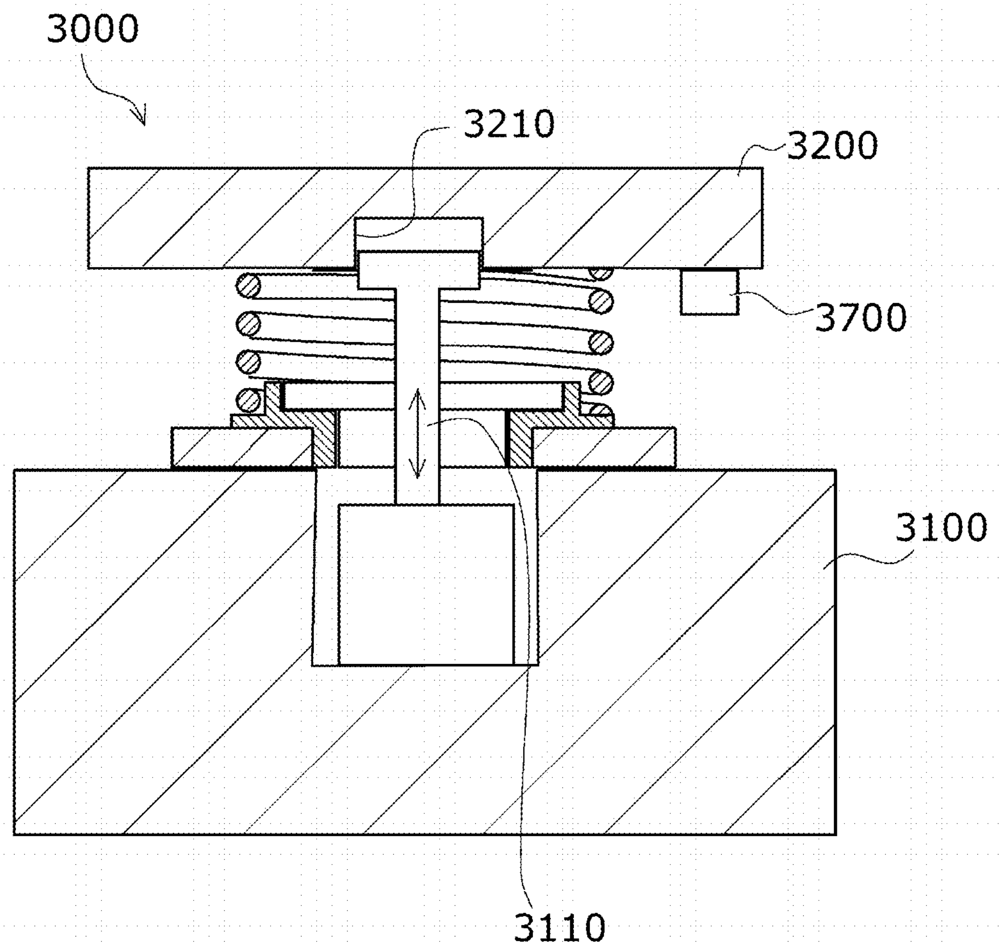
FIG. 30 is a diagram showing an example of a restriction means.

The restriction means 3500 includes the clamping pieces 3510 that clamp the workpiece installation stage 3200 from both sides, but it can be any means that can regulate displacement of the workpiece installation stage 3200. For example, as shown in FIG. 30, a hole 3210 may be provided in the lower face of the workpiece installation stage 3200, a pin 3110 may be provided from the lower side of the workpiece holding base part 3000 to move upward and downward in order to switch between the hold state and the release state of the workpiece installation stage 3200 by inserting or removing the pin 3110 in the hole 3210. Similarly, a pin may be provided in the lower face of the workpiece installation stage 3200 and a cylinder may be provided from the lower side of the workpiece holding base part 3000 to move upward and downward in order to switch between the hold state and the release state of the workpiece installation stage 3200 by inserting or removing the cylinder into the pin.

The present invention is not limited to the above exemplary embodiments, and can be appropriately modified without departing from the gist.

In the above embodiments, the floating joint par is provided on either the measuring device or the workpiece holding part, but each of the measuring device and the workpiece holding part may include the floating joint part.

Similarly, in the above exemplary embodiments, the vibration motor is provided on either the measuring device or the workpiece holding part, but each of the measuring device and the workpiece holding part may include the vibration motor.

REFERENCE SIGNS

100 Automatic measuring apparatus
111 Conveyor belt
112 Stocker
120 Measuring-apparatus main body
130 Robot arm part
140 Robot hand
150 Camera
200 Automatic measuring unit (automatic micrometer device)
300 Micrometer (measuring device)
310 U-shaped frame (fixed element)
311 Display panel
320 Anvil
330 Spindle (movable element)
340 Thimble part
350 Displacement detection part
400 Measuring-device support frame part
410 Base frame
411 First long side part
412 Second long side part
413 First short side part
414 Second short side part
420 Measuring-device holding part
421, 422 Clamping piece
423 Elastic rubber sheet
460 Workpiece holding base part (workpiece holding part)
461 Supporting column
462 Workpiece placing plate
500 Automatic operation part
510 Motor housing
520 Motor
530 Power transmission part
531 Fastening ring
532 Rotating plate
533 Transmission link rod
600 Vibration motor (vibration actuator)
800 Control unit
2100 Automatic inside-diameter measuring apparatus
2110 Measuring-apparatus main body
2120 Electric inside-diameter measuring unit
2130 Articulated robot arm part
2131 Hand part
2132 Force sensor part
2140 Control unit
2150 Measurement operation control unit
2151 Restriction control unit
2152 Motor drive control unit
2153 Measurement value acquisition unit
2160 Robot arm drive control unit
2170 Central control unit
2200 Electric inside-diameter measuring device
2210 Cylinder case part (fixed element)
2211 Upper cylinder case part
2213 Middle cylinder case part
2214 Lower cylinder case part
2215 Head cylinder part
2216 Plate spring
2220 Measuring head part
2230 Rod
2231 Upper rod
2233 Lower rod
2240 Thimble part
2241 Thimble sleeve
2242 Ratchet sleeve
2243 Coil spring (load regulating elastic body)
2250 Contact point (movable element)
2251 Tapered surface
2252 Round shaft tip
2600 Displacement detection part
2261 Rotor
2262 Stator
2270 Outer case part
2271 Outer case body part
2272 Outer case upper part
2273 Display unit
2274 Display part
2280 Electric drive unit (automatic operation part)
2300 Measuring-device support frame part
2300 Support frame part
2310 Support column part
2320 Support base part
2321 First insertion hole
2400 Floating joint part (floating joint mechanism part)
2410 Rotation-allowing mechanism part
2412 Coil spring (elastic body)
2414 Ring hole
2420 Translation-allowing mechanism part
2421 Horizontal plate (translation body)
2422 Second insertion hole
2423 Ball roller
2500 Restriction means
2510 Clamping piece
2600 Collision detection part
2601 Fixed plate
2602 Mounting plate
2610 Linear guide
2611 Groove frame body
2612 Slide body
2620 Coil spring
2630 Contact sensor

2631 Contact detection block
2632 Ball plunger
2700 Vibration motor (vibration actuator)
2710 Mounting support
3000 Workpiece holding base part (workpiece holding part)
3100 Base part
3110 Pin
3200 Workpiece installation stage
3210 Hole
3400 Floating joint part
3410 Rotation-allowing mechanism part
3412 Coil spring
3420 Translation-allowing mechanism part
3421 Horizontal plate (translational body)
3423 Ball roller
3500 Restriction means
3510 Clamping piece
3700 Vibration motor

The invention claimed is:

1. An automatic measuring apparatus comprising:

a measuring device configured to measure a dimension of a workpiece, the measuring device including a movable element configured to be displaceable with respect to a fixed element and to move forward and backward to be brought into contact with or away from the workpiece, and a displacement detection part configured to detect a displacement or position of the movable element;

an automatic operation part configured to automate the forward/backward movement of the movable element by power; and a vibration actuator configured to, when the movable element is brought into contact with the workpiece, directly or indirectly apply vibration to at least one of the workpiece and the measuring device to facilitate a change in a relative position and posture between the workpiece and the measuring device in such a manner that contacting surfaces of the workpiece and the movable element are in close contact with each other by changing the relative position and posture between the workpiece and the measuring device at a pressure lower than a predetermined measurement pressure set in advance in the measuring device, wherein the automatic measuring apparatus is configured to automatically measure the workpiece using the measuring device.

2. The automatic measuring apparatus according to claim 1, further comprising:

a mover configured to relatively move the workpiece and the measuring device to place the workpiece within a measurement range of the measuring device; and a floating joint part interposed between the mover and the measuring device to allow relative translation and rotation of the measuring device with respect to the mover, wherein the vibration actuator is attached to the measuring device.

3. The automatic measuring apparatus according to claim 1, further comprising:

a workpiece holding part configured to hold the workpiece, wherein the workpiece holding part holds the workpiece in such a manner that a position and posture of the workpiece is changed at a pressure lower than the predetermined measurement pressure set in advance in the measuring device when the movable element is brought into contact with the workpiece, and the vibration actuator is attached to the workpiece holding part.

4. The automatic measuring apparatus according to claim 1, wherein the automatic operation part moves the movable element forward to bring the movable element into contact with the workpiece, then moves the movable element backward by a predetermined amount, and finally moves the movable element forward again to generate the predetermined measurement pressure between the workpiece and the movable element, and the vibration actuator is driven, when the movable element is moved forward again to generate the predetermined measurement pressure between the workpiece and the movable element.

5. The automatic measuring apparatus according to claim 4, wherein the displacement detection part acquires the displacement or position of the movable element as a measurement value after the automatic operation part stops the forward re-movement of the movable element and the vibration actuator stops driving.

* * * * *